United States Patent [19]

Bujanos et al.

[11] Patent Number: 5,802,323

[45] Date of Patent: Sep. 1, 1998

[54] TRANSPARENT BURST ACCESS TO DATA HAVING A PORTION RESIDING IN CACHE AND A PORTION RESIDING IN MEMORY

[75] Inventors: Norman Bujanos, Austin, Tex.; Joseph P. Geisler, West Lafayette, Ind.

[73] Assignee: Advanced Micro Devices, Inc., Sunnyvale, Calif.

[21] Appl. No.: 663,968

[22] Filed: Jun. 14, 1996

[51] Int. Cl.[6] .................................................. G06K 13/00
[52] U.S. Cl. ............................................ 395/287; 711/100
[58] Field of Search ................................ 395/280, 473, 395/465, 287–312; 711/100

[56] References Cited

U.S. PATENT DOCUMENTS

| 4,646,237 | 2/1987 | Allen | 395/287 |
|---|---|---|---|
| 4,912,632 | 3/1990 | Gach et al. | 395/473 |
| 5,072,369 | 12/1991 | Theus et al. | 395/473 |
| 5,228,134 | 7/1993 | MacWilliams et al. | 395/465 |
| 5,459,852 | 10/1995 | Nakagawa et al. | 395/465 |
| 5,524,235 | 6/1996 | Larson et al. | 395/478 |
| 5,528,764 | 6/1996 | Heil | 395/293 |
| 5,557,769 | 9/1996 | Bailey et al. | 395/473 |
| 5,596,731 | 1/1997 | Martinez, Jr. et al. | 395/309 |
| 5,651,137 | 7/1997 | MacWilliams et al. | 395/468 |

OTHER PUBLICATIONS

Intel Corporation, 82420EX PCISET Data Sheet 82425EX PCI System Controller (PSC) and 82426EX ISA Bridge (IB), Nov. 1995 (particularly pp. 101–120).
Motorola, Inc., MPC105 PCI Bridge/Memory Controller User's Manual, 1995 (particularly pp. 7–1 through 7–21).

*Primary Examiner*—Ayaz R. Sheikh
*Assistant Examiner*—David A. Wiley
*Attorney, Agent, or Firm*—Skjerven, Morrill, MacPherson, Franklin & Friel; David W. O'Brien

[57] ABSTRACT

A bus control interface selectively and transparently couples a bus agent to a cache and to a memory to provide transparent burst access to addressable data having a portion residing in cache and a portion residing in memory. The bus control interface steers transactions to the cache or to the memory depending on where the data resides. In this way, the bus control interface supports, without a disconnect, burst read transactions that cross cache line boundaries. The bus control interface also supports bus watching single-word read (and write) transactions as well as burst write transactions.

27 Claims, 20 Drawing Sheets

TRANSPARENT BURST ACCESS TO DATA HAVING A PORTION RESIDING IN CACHE AND A PORTION RESIDING IN MEMORY

BACKGROUND OF THE INVENTION

1. Field of the Invention

The invention relates to bus architectures, and in particular to a system for handling burst data access in a bus architecture.

2. Description of the Related Art

Computer systems typically incorporate backplane busses for transferring data among components such as processors, memories, and input/output (I/O) devices. Indeed, modern high performance computer systems often provide a hierarchy of busses tailored to the varying bandwidth requirements and capabilities of such components. For example, an extremely high speed processor bus is often used for processor-to-memory communications, a high speed I/O bus (or local bus) may be provided for high bandwidth data transfers to and from devices such as a graphics display adapter, and a lower speed expansion bus is typically provided for connecting a variety of lower speed I/O devices such as disk controllers, modems, etc. Pairs of busses are often coupled by bridges which buffer data and which understand the protocols associated with each of the busses they bridge.

A variety of bus types are commonly incorporated in personal computer system designs. These commonly incorporated bus types include the Peripheral Component Interconnect (PCI) bus, the VESA local bus (VL bus) based on the Video Electronics Standards Association standard, the Industry Standard Architecture (ISA) bus, the Extended Industry Standard Architecture (EISA) bus, and the Micro Channel Architecture (MCA) bus.

Modern backplane buses, such as the PCI, VL, EISA, and MCA busses, support burst data transfers as a technique for improving overall data transfer bandwidth. Burst data transfers typically include a single address phase followed by a sequence of data phases. Because only the first address is provided by the data transfer initiator and multiple data words are transferred based on that single address, the bandwidth of bursted bus transfers is greater than for single-word, explicitly addressed transfers. Two common uses of burst mode transfers are for cache line fills from memory and for Direct Memory Access (DMA), although most multi-word data targets can benefit from burst transfer techniques.

Part of any burst transfer is an implicit addressing order for transfers of subsequent data. One common burst order is sequential based on memory address; however, other orders are possible. For example, processors conforming to standards set by the i486™ microprocessor available from Intel Corporation of Santa Clara, Calif., implement a cache line fill addressing sequence wherein the address order varies depending on the address of the first data word accessed. Such cache line fill addressing sequences allow interleaved, DRAM-based memory systems to efficiently mask row and column address setup times for subsequent accesses, thereby improving data transfer bandwidth. The operative burst address order may be established by prior agreement or, as in the case of the PCI bus definition, may be selected by bus signals. See Shanley and Anderson, *PCI System Architecture*, MindShare Press, Richardson, Tex., 1993, pp. 87–88 (describing burst transfer addressing sequences).

In the case of transfers to and from cacheable memory, an additional complication arises since a particular memory location may be represented in memory or in both memory and cache. For example, in a computer processor system having a memory and a cache, where the memory and cache are operated in accordance with a write-back memory update policy, the data states of the memory and cache will usually become out of sync with each other. The cache will contain data values which are associated with addressable memory locations but which have not yet been written back to those memory locations. Nonetheless, only a subset of all addressable memory locations will be represented in cache at any one time. As a result, the current data value associated with an addressable memory location may reside in cache, in memory, or, in certain situations, in both cache and memory.

Because the cache contains recently modified representations of data associated with certain addressable memory locations that are not yet written back to memory, memory read transactions associated with those addressable memory locations must be serviced by the cache. On the other hand, data for other memory read transactions may reside only in memory. Since a given burst transfer may cross one or more of the boundaries between cached and uncached data, a method must exist for supplying the addressed data from the correct source or sources.

In a PCI bus system, this complication is handled by forcing a disconnect of a burst transfer when a cache line boundary is crossed. A PCI master drives a start address onto the address/data bus (AD) at the start of the burst transfer (i.e., during the address phase). The cache then latches this start address and uses it to check for a snoop hit. As the burst progresses, the memory target must monitor to determine if the burst transfer crosses a cache line boundary. When the burst transfer crosses a cache line boundary, the memory target forces the PCI master to disconnect by asserting a STOP# signal. This forces the PCI master to place the start address of the next line onto the AD bus at the start of the next transaction it initiates. The cache can then snoop the next line address.

Although PCI bridges such as the Motorola MPC105 and Intel 82420EX can access both memory and cache, they do not support burst transactions that extend beyond one cache line. Both processors disconnect, forcing the master processor to restart the transaction at the next cache line. If a memory access target continually disconnects because it hits the end of a cache line, the transaction completion time increases. The master must re-request the PCI bus after every disconnect until the transaction concludes. Overall throughput of transactions that cross several cache line boundaries can be severely hampered.

SUMMARY OF THE INVENTION

It has been discovered that transparent burst access to data having a portion residing in cache and a portion residing in memory may be provided by an interface which steers transactions either to the cache or to the memory depending on where the data resides. In this way, such an interface supports, without a disconnect, burst read transaction that cross cache line boundaries. Advantageously, only the interface and cache require knowledge about bus watching activities. Memory subsystems, processor cores, and bus systems (including bus agents and bridges) need not provide bus watching capabilities and need not be modified to support transaction steering. Also advantageously, the interface transparently steers individual accesses (of a burst memory transfer) between a memory and a cache without interruption of the ready train. Furthermore, a split data and instruction cache system embodiment of the present invention allows servicing of a bus agent's memory access by the data cache, while simultaneously allowing servicing of an instruction cache line fill by the memory.

In one embodiment of the present invention, a bus control interface includes a first address receiving port, a first data providing port, first and second address providing ports, and first and second data receiving ports. The bus control interface further includes memory transaction supplying logic, control logic, and bus driver logic. The first address receiving port and the first data providing port are respectively coupled to receive a first memory address from, and provide data to, a bus agent. The first address providing port and the first data receiving port are each coupled to a cache, while the second address providing port and the second data receiving port are each coupled to a memory subsystem. The memory transaction supplying logic is coupled between the first address receiving port and the second address providing port. The control logic is coupled to the cache and to the memory subsystem. The control logic is responsive to an intervention signal from the cache, dequeuing a burst memory access at the memory subsystem in response to an assertion of the intervention signal and requeuing the burst memory access at the memory subsystem in response to a deassertion of the intervention signal. The bus driver logic is also responsive to the intervention signal, selectively coupling the first data receiving port to the first data providing port in response to an assertion of the intervention signal and selectively coupling the second data receiving port to the first data providing port in response to a deassertion of the intervention signal.

In a further embodiment of the present invention, the bus control interface also includes a next address store. The next address store is responsive to successive ready for next data signals, incrementing in response to successive ready for next data signals. The control logic supplies a next address value from the next address store to the memory subsystem to requeue the burst memory access.

In yet another embodiment of the present invention, a computer system includes a memory subsystem, a cache, a burst transfer agent, and an interface unit. The memory subsystem has multiple addressable storage locations for representing data and the cache has multiple cache storage locations for representing cached data, where the cache storage locations are dynamically associated with cached addressable storage locations of the memory subsystem. The interface unit is coupled between the burst transfer agent and the memory subsystem and between the burst transfer agent and the cache. The interface unit provides transparent burst mode read access to data associated with a block of the addressable memory locations, where a first portion of the block is represented in the cache and a second portion of the block is represented in the memory subsystem. The interface unit selectively and transparently couples either the memory subsystem or the cache to the burst transfer agent, where the cache is coupled when data associated with a current read position in the block are represented in the cache and where the memory subsystem is coupled when the data associated with the current read position in the block are not represented in the cache.

In a further embodiment of the present invention, the cache includes a next address store responsive to successive ready for next data signals, incrementing in response to ready for next data signals. The cache asserts and deasserts the intervention signal in correspondence with the cached/ uncached status addressable storage locations associated with a next address value from the next address store.

In yet another embodiment of the present invention, a method for transparently steering individual accesses of a burst memory transfer between a memory subsystem and a cache includes supplying, comparing, asserting, dequeueing, incrementing, comparing, deasserting, requeuing, and supplying steps. In the particular, the method includes coincidently supplying a first memory address to a memory subsystem and to a cache, comparing the first memory address against a representation of cached addresses, and, in response to the assertion of the data intervention signal, dequeuing access to memory subsystem data associated with the first memory address, and instead, supplying data from the cache. The method further includes incrementing a next address coincident with the supplying of data associated with subsequent memory addresses and comparing the next address against cached addresses and deasserting the data intervention signal, when the next address does not match one of the cached addresses. The method further includes the steps of requeuing, in response to a deassertion of the data intervention signal, a second memory address at the memory subsystem, where the second memory address corresponds to the next address and supplying data associated with the second memory address from the memory subsystem.

In still yet another embodiment of the present invention, an apparatus includes read request distribution logic, selective bus coupling logic, and control logic. The read request distribution logic is to provide information from a memory read requester to first and second storage devices, where the second storage device is adapted to cache data represented by the first storage device. The selective bus coupling logic is to couple either the first or the second storage device to the memory read requester. The control logic is coupled to the selective bus coupling logic and is responsive to an intervention signal from the second storage device. In response to an assertion of the intervention signal, the control logic discontinues a memory read request for the first storage device and causes the selective bus coupling logic to couple the second storage device to the memory read requester. In response to a deassertion of the intervention signal, the control logic continues the memory read request at the first storage device and causes the selective bus coupling logic to couple the first storage device to the memory read requester.

In still yet a further embodiment of the present invention, the apparatus also includes a next address store responsive to successive ready for next data signals, incrementing in response to successive ready for next data signals. The memory read request requeuing logic supplies a next address value from the next address store to the first storage device to requeue the memory read request.

BRIEF DESCRIPTION OF THE DRAWINGS

The present invention may be better understood, and its numerous objects, features, and advantages made apparent to those skilled in the art by referencing the accompanying drawings.

FIGS. 3A and 3B are collectively referenced herein as FIG. 3.

FIGS. 4A, 4B, and 4C are collectively referenced herein as FIG. 4.

FIGS. 5A, 5B, and 5C are collectively referenced herein as FIG. 5.

Use of the same reference symbols in different figures indicates similar or identical items.

DETAILED DESCRIPTION OF THE PREFERRED EMBODIMENTS

Figure 1:
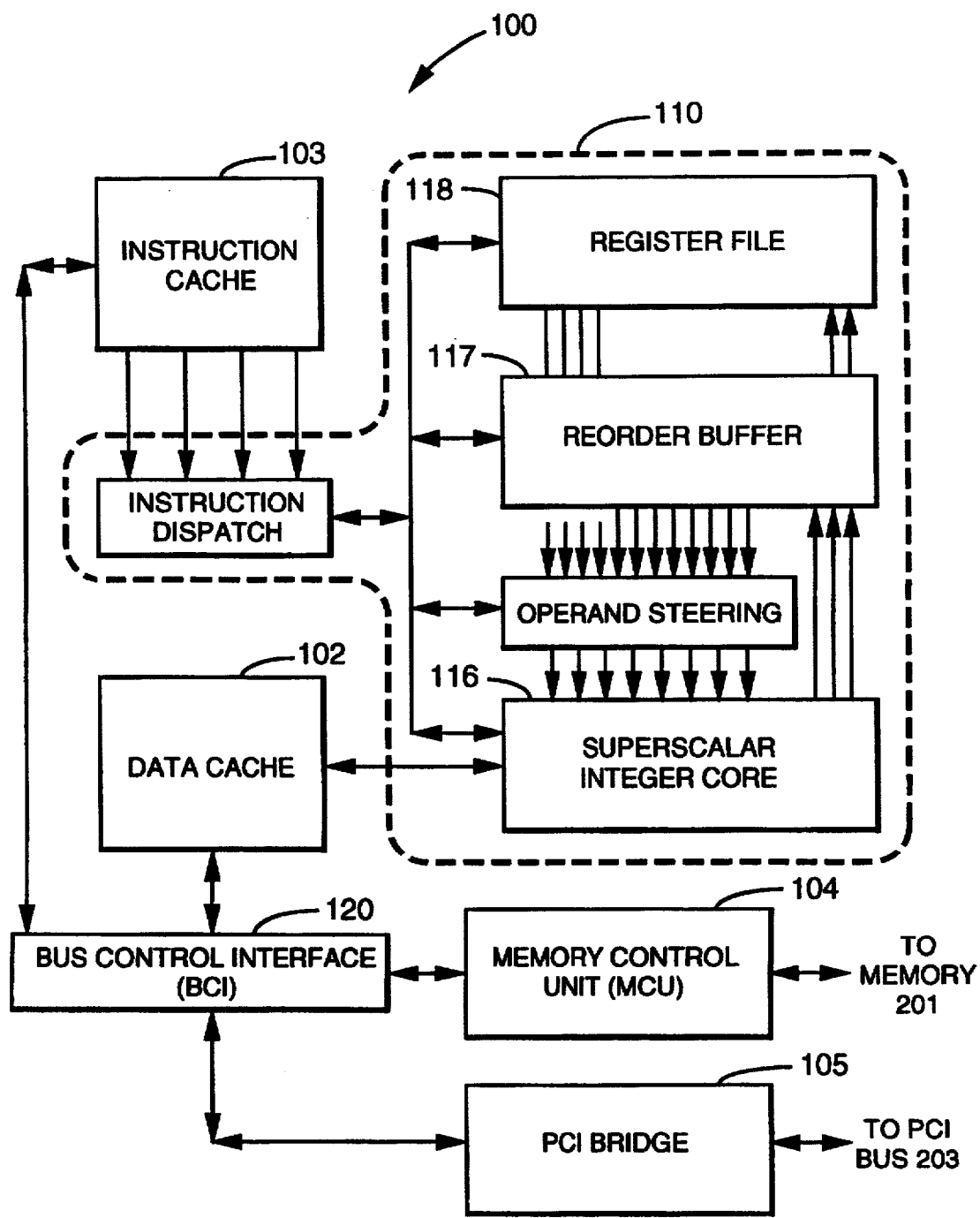
FIG. 1 is a block diagram of a processor configuration incorporating a bus/cache/memory interface in accordance with an exemplary embodiment of the present invention.

FIG. 1 depicts an exemplary processor configuration 100 which incorporates a Bus Control Interface, BCI 120, providing transparent burst access to data in accordance with the present invention. In the embodiment of FIG. 1, BCI 120 is coupled to a split cache which includes a data cache 102 portion and an instruction cache 103 portion; however, the split cache configuration is merely illustrative, and alternative cache configurations, such as a single integrated cache for instructions and data, are also suitable. BCI 120 is also coupled to memory via memory control unit, 104 and to a PCI bus via PCI bridge 105. BCI 120 mediates memory accesses generated by devices on the PCI bus (not shown) which address data stored in memory 201 and/or data cache 102. In addition, in the exemplary embodiment in FIG. 1, BCI 120 mediates cache line fills from memory 201 to instruction cache 103 and to data cache 102.

In the exemplary embodiment in FIG. 1, a processor core 110 is shown which includes a superscalar integer core 116, a reorder buffer 117, and a register file 118. Alternate processor embodiments are also suitable. For example, single execution unit processor cores, multiple execution unit processor cores, and mixed integer and forwarding point processor cores are all suitable alternatives to the exemplary processor core shown in FIG. 1.

Transactions involving memory access by an PCI agent are now described with reference to FIG. 2. BCI 120 selectively couples PCI agent 202 to memory subsystem 241 and data cache 102, steering memory transactions to the appropriate target depending on the cached status of a particular addressed memory location. Referring back to FIG. 1, only two internal units of processor configuration 100, the data cache 102 and BCI 120, require knowledge about bus watching activities. Advantageously, neither memory subsystem 241 (i.e., memory control unit 104 and memory 201) nor the PCI subsystem (i.e., PCI bridge 105, PCI bus 203, and PCI agents such as PCI agent 202) require knowledge of bus watching activities.

Referring again to FIG. 2, PCI agent 202 is representative of any PCI agent residing on a PCI bus such as PCI bus 203. Typically, PCI agent 202 is a PCI bus master capable of initiating a transfer to or from a target device such as a memory or input/output device, although three party transactions such as those involving a master, a slave, and a target are also possible.

Figure 2:
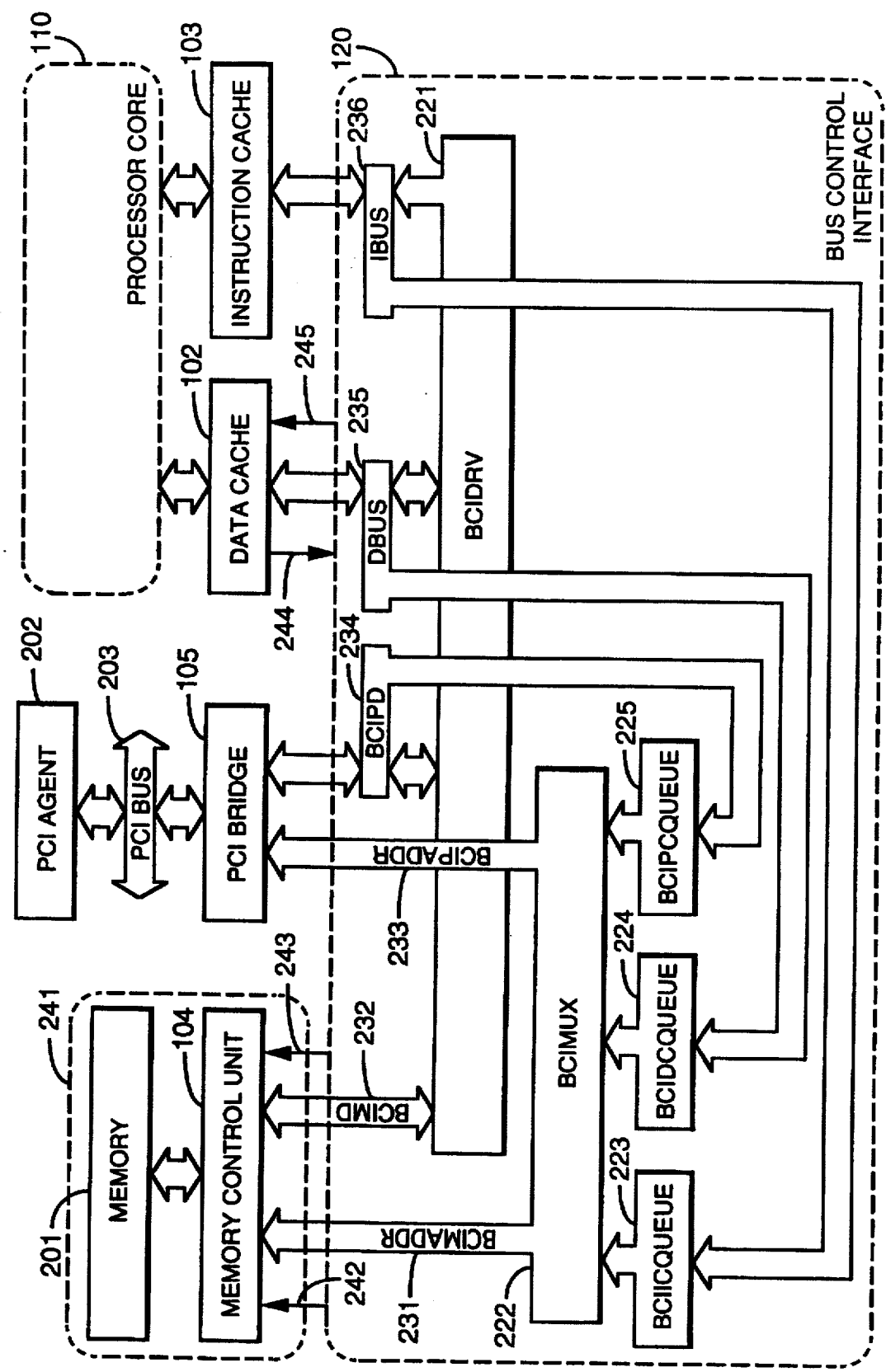
FIG. 2 is a block diagram of a bus/cache/memory interface in accordance with an exemplary embodiment of the present invention.

In the exemplary embodiment of FIG. 2, PCI agent 202 makes memory read requests on PCI bus 203 which are received by PCI bridge 105 on behalf of memory locations represented in memory 201 and/or data cache 102. Such memory read requests include a memory address which is supplied on BCIPD bus 234 to both BCIDRV 221 and BCIPCQUEUE 225. The memory read address is then provided to both memory subsystem 241 and data cache 102. In particular, the memory read address is driven onto the BCIMADDR bus 231 by BCIMUX 222 and onto DBUS 235 by BCIDRV 221. BCIPCQUEUE 225 is transparent during the first addressing phase of a memory access, but also latches a local copy of the memory read address for tracking the addresses of subsequent data words for use in transitioning from data cache 102 servicing to memory subsystem 241 servicing of a burst memory access.

Memory control unit 104 queues a memory read request based on the address received via BCIMADDR bus 231. Coincidently, data cache 102 performs a tag look up based on the address received via DBUS 235. If data cache 102 finds a tag corresponding to the address provided, it supplies a data cache data intervention signal (DCDI) to BCI 120 on line 244. Responsive to the DCDI signal, BCI 120 dequeues the memory access pending at memory control unit 104. BCI 120 dequeues the memory access by deasserting the BCI-MMEM signal on line 242 and by coincidently deasserting the internal BCI signal, PCIQVAL (not shown in FIG. 2). Data cache 102 then drives the cached data onto DBUS 235. BCIDRV 221 supplies the cached data to PCI bridge 105 via BCIPD bus 234. PCI bridge 105 in turn supplies the cached data to PCI agent 202 via PCI bus 203. As the cached data is supplied to PCI bridge 105, BCI 120 signals data cache 102 that it is ready for the next data by asserting the BIUDRDY signal on line 245. Responsive to the BIUDRDY signal, data cache 102 supplies the next data item on DBUS 235. BCIDRV 221 then supplies the data to PCI bridge 105 via BCIPD bus 234. As before, PCI bridge 105 supplies the cached data to PCI agent 202 via PCI bus 203 and BCI 120 signals data cache 102 that BCI 120 is ready for the next data, i.e., BCI 120 asserts the BIUDRDY signal to data cache 102 on line 245. Data cache 102 maintains a local copy of the next address which it increments on of each BIUDRDY assertion.

With the exception of storage for maintaining and incrementing a local copy of the next address, data cache 102 is a cache of any conventional design, e.g., a direct-mapped cache, a set associative cache, a fully associative cache, etc. Suitable designs for data cache 102 are well known and will be appreciated by those of ordinary skill in the art. Storage for maintaining and incrementing a local copy (within data cache 102) of the next address is also conventional. Suitable designs for sequential logic providing an incrementing address register are well known and will be appreciated by those of ordinary skill in the art. Modifications for providing address sequences other than linear, e.g. 486 burst addressing sequences or for selectively providing alternate address sequences are straight-forward and will also be appreciated by those of ordinary skill in the art. Data cache 102, including next address storage and sequential logic, is in accordance with any such suitable designs. Additionally, although the exemplary embodiment of FIG. 2 depicts a dual-ported data cache coupled between processor core 110 and BCI 120, alternative embodiments may incorporate single ported cache designs. For example, a single ported data cache coupled to BCI 120 and to a processor core, such as 110, via a shared bus would also be suitable.

As data cache 102 increments its local copy of the next address, data cache 102 checks to see if data associated with the incremented address is represented in data cache 102. If not, i.e., if a cache miss occurs on tag lookup in an associated tag store, data cache 102 de-asserts the DCDI signal on line 244. Responsive to a de-assertion of DCDI, BCI 120 requeues a memory access at memory control unit 104. The requeued memory access begins at the cache miss address. In order to requeue a memory access to memory 201, BCI 120 maintains a local copy of the next address at BCIPC-QUEUE 225. This next address is supplied on BCIMADDR 231 to requeue the memory access at memory control unit 104. In response, memory control unit 104 supplies data addressed by the supplied address to BCIDRV 221 via BCIMD bus 232. BCIDRV 221 thereupon supplies the addressed data to PCI bridge 105 via BCIPD bus 234. As before, the data is supplied to external PCI agent 202 via PCI bus 203. A BCIMRDY signal is supplied to memory control unit 104 to indicate that PCI bus 203 is ready for the next data.

Coincident with the supply of BCIMRDY, the BIUDRDY signal is supplied to data cache 102. Responsive to the BIUDRDY signal, data cache 102 increments its local copy of the next address and checks the incremented next address against its tag store, though data are currently being supplied from memory 201 rather than from data cache 102. In this way, data cache 102 stays in sync with the burst memory access being serviced by memory 201 and will intervene upon a subsequent cache hit. Data continue to be supplied from memory 201 via memory control unit 104 until either the memory transaction is terminated or data cache 102 asserts the data cache data intervention signal (DCDI) in response to a match between data cache 102's local copy of the next address and an entry in data cache 102's tag store. In such a case, data cache 102 asserts the DCDI signal on line 244 and BCI 120 terminates the memory access from memory 201 by asserting the BCIMTERM signal on line 307. Cached data is then supplied from data cache 102 to PCI agent 202 via DBUS 235, BCIDRV 221, BCIPD bus 234, PCI bridge 105, and PCI bus 203, as described above.

The exemplary embodiment of FIG. 2 also depicts additional data paths for supporting cache line fills to data cache 102 and instruction cache 103. BCI 120 provides these additional data paths and functionality beyond that required for transparently steering burst memory transactions between memory 201 and data cache 102. For example, the addressable memory locations backing data cache 102 and instruction cache 103 may reside at memory 201 or, alternatively, at another PCI agent (not shown) on PCI bus 203. As a result, BCIMUX 222 provides data paths to both memory 201 and to external PCI memory (via BCIPADDR bus 233, PCI bridge 105, and PCI bus 203). Additionally, if data cache 102 is busy providing data to PCI bridge 105, memory subsystem 241 can service requests from instruction cache 103. Also, if memory subsystem 241 is busy providing data to PCI bridge 105, data cache 102 can service requests for cached data from processor core 110.

Figures 1, 3A:
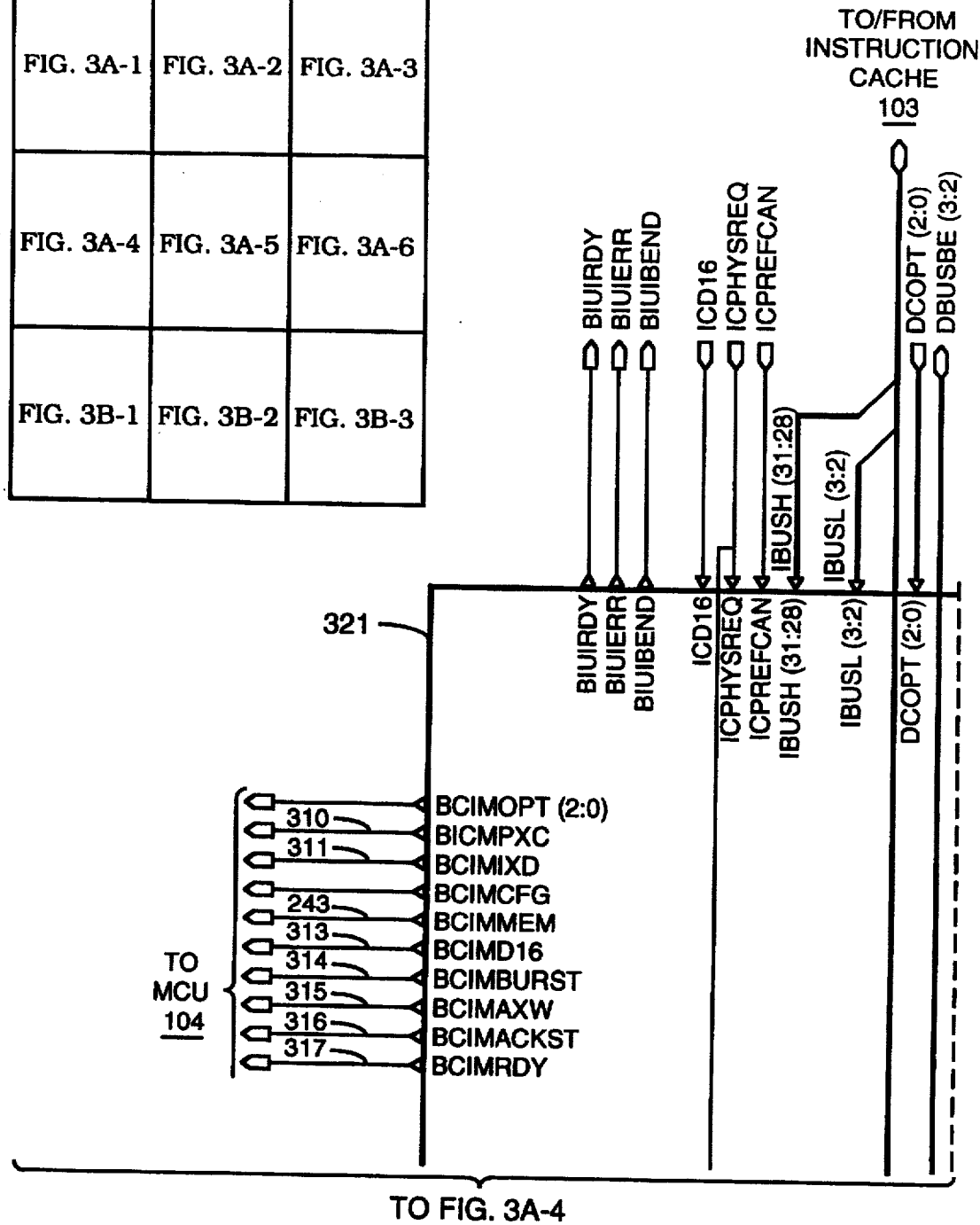
FIGS. 3A and 3B are portions of a block diagram respectively depicting control and data portions of a bus/cache/ memory interface in accordance with an exemplary embodiment of the present invention.
Figures 2, 3A:
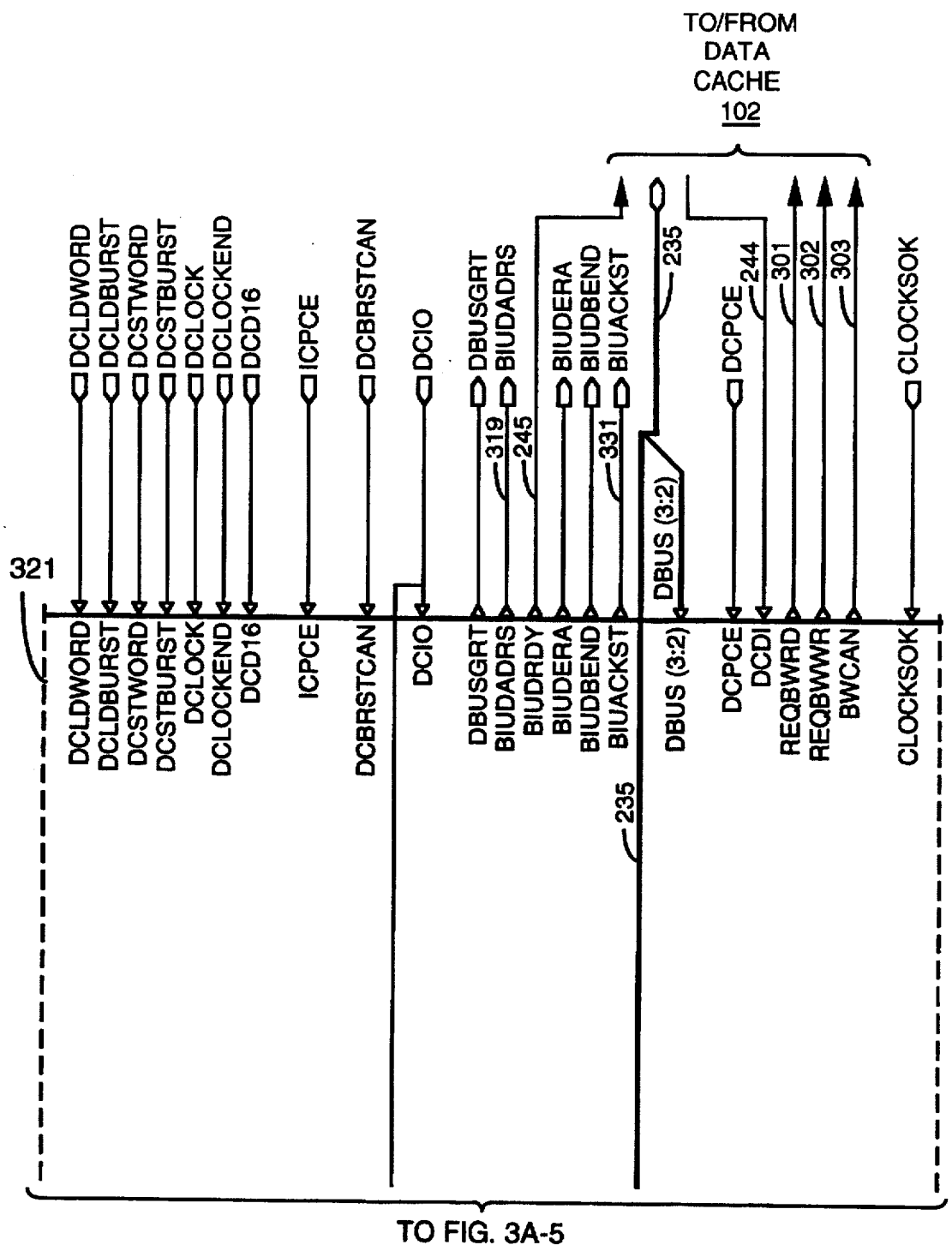
Figures 3, 3A:
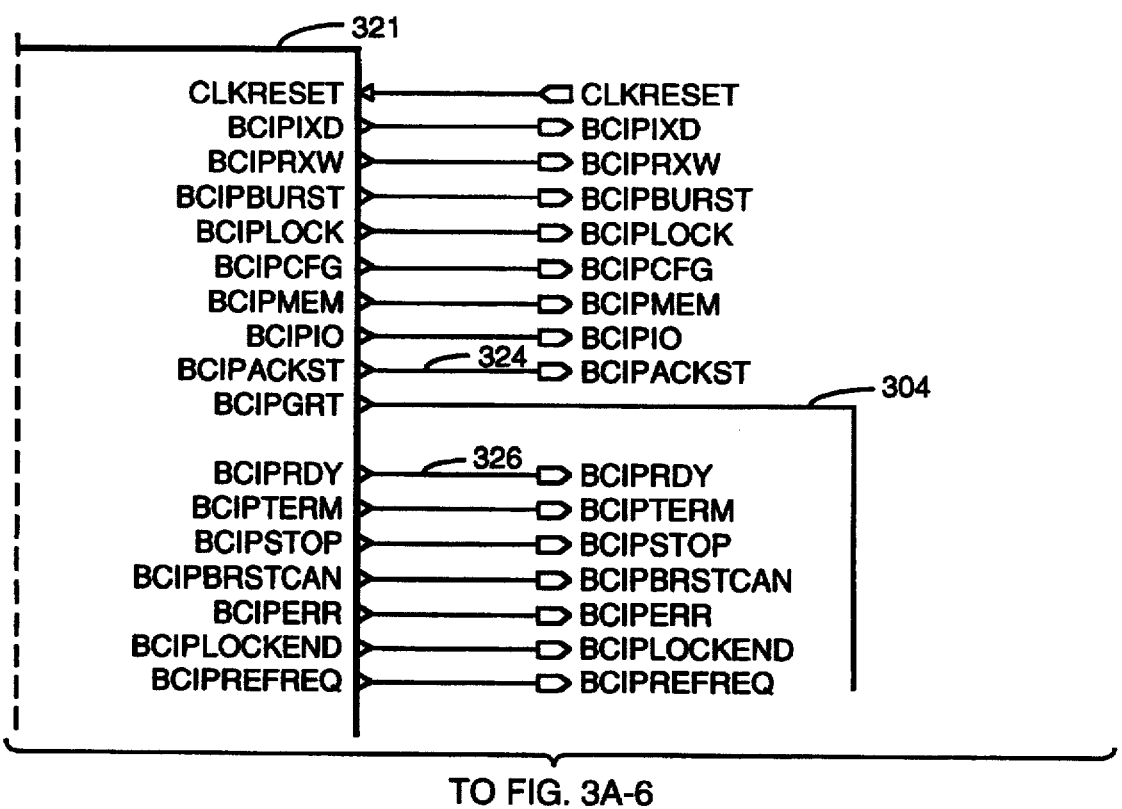
Figures 3, 3A, 4:
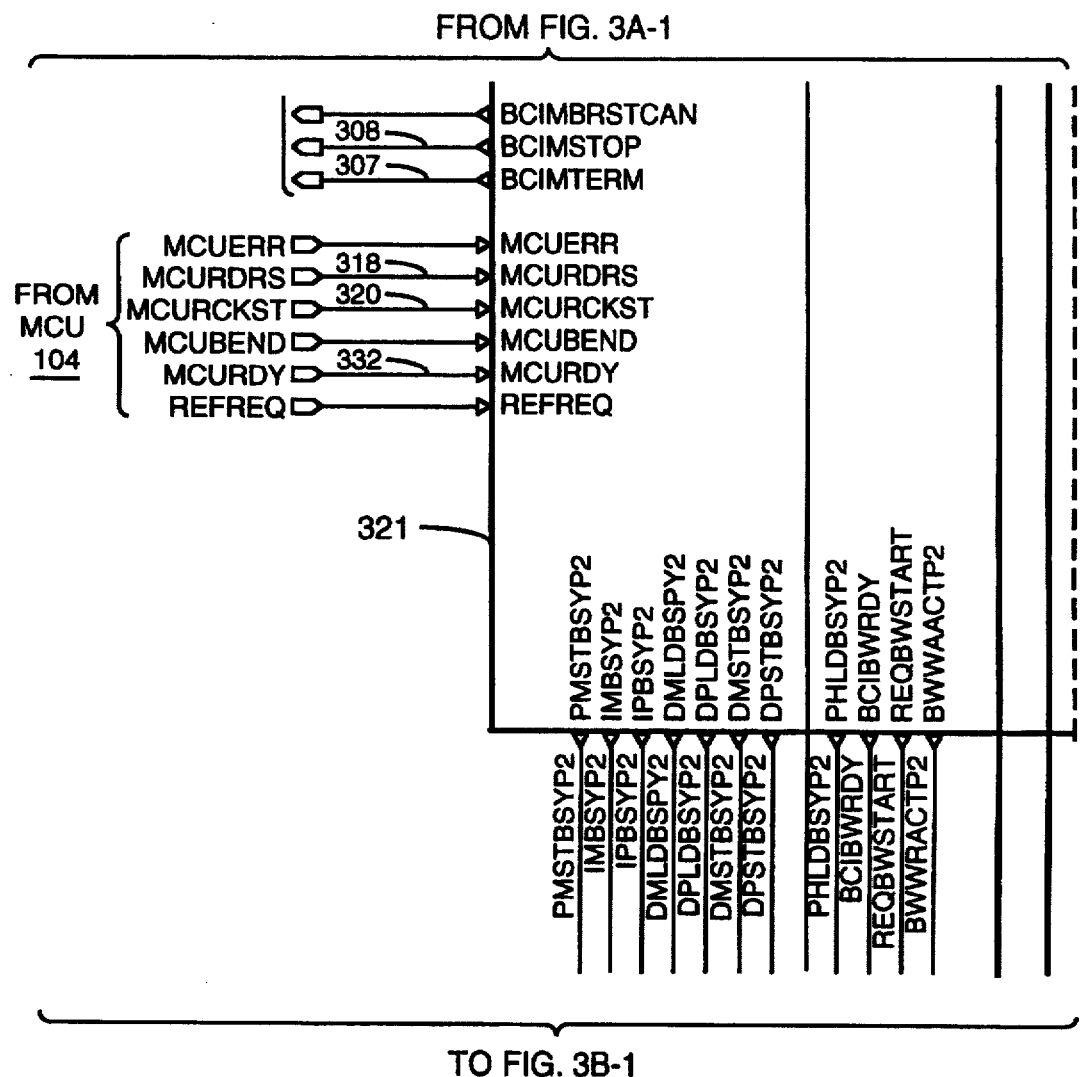

FIG. 3 depicts a functional block diagram decomposition of BCI 120 into a control portion (BCICTL 321) and a data path portion (BCIDATA 322) together with signal flows between BCICTL 321 and BCIDATA 322 portions. FIG. 3 also depicts the control signal lines and busses coupling component portions of BCI 120 to memory subsystem 241, PCI bridge 105, data cache 102, and instruction cache 103. FIG. 4 then depicts a further functional and signal decomposition of the BCIDATA 322 block.

Referring to FIGS. 3 and 4, BCICTL 321 and the component blocks of BCIDATA 322 receive and provide control and data signals from and to memory control unit 104, data cache 102, and PCI bridge 105. DBUS 235 is a multiplexed data and address bus for supplying addresses and data to and from data cache 102. Data cache 102 supplies a data cache data intervention (DCDI) signal on line 244 when either a memory address value supplied on DBUS 235 or that internally latched and incremented by data cache 102 matches the address of data represented in data cache 102, i.e., on a cache hit. In particular, BCICTL 321 supplies bus watching read request (REQBWRD), bus watching write request (REQBWWR), and bus watching cancel (BWCAN) signals to data cache 102 via lines 301, 302 and 303, respectively. BCICTL 321 supplies the BIUDRDY signal to data cache 102 (via line 245). BCI 120 implements a BIUDRDY protocol which is now described for processor core to memory subsystem 241 writes and for read and write transactions via PCI Bridge 105 to memory subsystem 241.

The BIUDRDY signal is supplied during processor core to memory transactions as follows. During a store from data cache 102 to memory subsystem 241, the MCU 104 asserts MCUADRS on line 318 signifying the transaction start. BCICTL 321 steers MCUADRS to data cache 102, supplying the BIUDADRS signal on line 319. During the next cycle (cycle 2), data cache 102 drives data onto DBUS 235. During the following cycle (cycle 3), if MCU 104 was able to send the data to memory, it asserts the MCU ACKnowledge Store signal (MCUACKST) on line 320. BCICTL 321 steers this signal to data cache 102, supplying the BIUACKST signal on line 331. The BIUACKST signal informs data cache 102 that MCU 104 is ready for the next word in the store burst. During the next cycle (cycle 4), data cache 102 drives the next word onto DBUS 235. During this same cycle, MCU 104 asserts MCURDY on line 332. BCI steers this ready signal to data cache 102, supplying the ready signal as BIUDRDY on line 245. This MCURDY/BIUDRDY signal signifies that the first word was successfully written to memory 201. Similar ACKST/RDY assertions continue until the access is terminated. If during cycle 3, MCU 104 did not assert the MCUACKST signal, data cache 102 would continue to drive the same data. Data cache 102 does not increment its internal address counter until BIUACKST asserts.

For bus watching memory writes from a PCI agent such as 202 (i.e., via PCI Bridge 105) to memory subsystem 241, the BIUDRDY signal is supplied as follows. When PCI Bridge 105 drives data onto BCIPD bus 234, it also asserts the PCIRDY signal on line 323. BCICTL 321 routes the PCIRDY signal to MCU 104, supplying a BCIMRDY signal on line 317. PCI Bridge 105 continues to drive the same data onto the BCIPD bus 234 and keeps PCIRDY asserted until MCU 104 asserts MCUACKST on line 320. The MCUACKST signal is routed to PCI Bridge 105 via a BCIPACKST signal on line 324. When PCIRDY and MCUACKST are asserted in the same cycle, BCICTL 321 signals data cache 102 that there is valid data on the bus by asserting BIUDRDY on line 245. Data cache 102 uses the BIUDRDY signal to increment its internal address counter. BCI 120 does not increment its address counter.

For bus watching memory reads from memory subsystem 241 to a PCI agent such as 202 (i.e., via PCI Bridge 105), the BIUDRDY signal protocol varies depending on whether the memory read hits in data cache 102. When data cache 102 has hit and is supplying data, PCI Bridge 105 signals that it has successfully sent read data to PCI agent 202 and asserts PCIACKST on line 325. BCICTL 321 signals data cache 102 that PCI Bridge 105 is ready for the next data word by routing the PCIACKST to BIUDRDY, and supplying a BIUDRDY assertion on line 245. For a data cache 102 miss, MCU 104 signals that it has driven valid data onto the BCIMD bus 232 by asserting MCURDY on line 332. BCICTL 321 routes the MCURDY signal to PCI Bridge 105 as BCIPRDY on line 326 and coincidently causes BCIDATA 322 to drive memory read data from BCIMD bus 232 onto BCIPD bus 234.

When PCI Bridge 105 provides the memory read data to PCI agent 202 and receives an ACKST from the PCI agent 202, PCI Bridge 105 asserts the PCIACKST signal on line 325. BCICTL routes PCIACKST to MCU 104 as the BCIMACKST signal on line 316. There may be several cycles of latency before the PCIACKST and BCIMACKST signals are asserted. During each such cycle, MCU 104 continues to drive the same data onto BCIMD 232 (but not MCURDY) until BCIMACKST asserts. Since data cache 102 is bus watching, each BIUDRDY assertion causes data cache 102 to increment its internal address counter. Therefore, BIUDRDY cannot assert until PCI Bridge 105 asserts PCIACKST. BCICTL 321 stores the information that MCU 104 has asserted MCURDY, but has not yet received BCIMACKST. When PCI Bridge 105 (i.e., PCI agent 202) eventually asserts PCIACKST, BCICTL 321 asserts BIUDRDY on line 24counter (a also increments it internal address counter (at BCIPCQUEUE 225) coincident with the supply of the BIUDRDY signal to data cache 102.

Alternative embodiments may assert BIUDRDY as soon as MCU 104 asserts MCURDY. However, data cache 102 logic is simplified by not asserting BIUDRDY until PCIACKST is asserted because of timing requirements placed on DCDI. To maintain a zero cycle latency in the transparent steering of memory access transactions from MCU 104 to data cache 102, data cache 102 asserts DCDI during the last word of the cache block. If data cache 102 received the last word of the block before PCI had received an ACKST signal, data cache 102 logic would have to handle a stall before supplying data for the next cache block.

Referring to FIG. 3, PCI bridge 105 interacts with BCI 120 by supplying and providing control and data signals via lines which include line 304, line 305, line 306, and buses 233 and 234. In particular, PCI bridge 105 requests a memory transaction and specifies the read or write character of the transaction by supplying a PCI request signal (PCIREQ) and a PCI read or write signal (PCIRXW) on lines 305 and 306, respectively. BCI 120 grants the BCIPD bus 234 to PCI bridge 105 by asserting the BCIPGRT signal on line 304. BCIPD bus 234 is a multiplexed address data bus via which a memory transaction address is supplied from PCI bridge 105 to BCI 120 on behalf of an external PCI agent such as PCI agent 202 (see FIG. 2). Data for memory read and write transactions are also transferred via BCIPD bus 234. BCIPADDR bus 233 supports the provision of memory addresses from BCI 120 to PCI bridge 105. In this way, transactions involving addressable memory targets residing externally (e.g., residing at an external PCI agent such as 202) are supported. BCICTL 321 supplies termination signals (BCIMTERM for a memory read and BCIMSTOP for a memory write) to memory control unit 104 (via lines 307 and 308, respectively) to terminate the servicing of a burst memory transaction by memory subsystem 241 (not shown).

FIG. 4 provides additional functional decomposition and signal detail for BCIDATA portion 322. The configuration of DBUS 235, BCIMD bus 232, BCIPD bus 234, BCIPADDR bus 233 and BCIMADDR bus 231 is as described above with reference to FIGS. 2 and 3. However, FIG. 4 also depicts the configuration of BCIDRV 221, BCIMUX 222, BCI data cache queue (BCIDCQUEUE) 224, and BCI PCI queue (BCIPCQUEUE) 225. The three BCI queues (i.e., BCIDCQUEUE 224, BCIICQUEUE 223, and BCIPCQUEUE 225) respectively queue addresses and other memory transaction information received from data cache 102, instruction cache 103, and PCI bridge 105 for provision by BCIMUX 222 to memory devices mediated by PCI bridge 105 and memory control unit 104. BCIMUX 222 is a three-to-two multiplexer capable of routing any two of its inputs to its outputs. In this way, BCIMUX 222 allows transactions from two sources selected from the set of data cache 102, instruction cache 103, and PCI bridge 105 to occur simultaneously as long as one transaction targets a memory location represented in memory subsystem 241 and the other targets a memory location represented beyond PCI bridge 105 (e.g., at a PCI agent on a PCI bus to which PCI bridge 105 couples). Alternative embodiments of BCI 120 need not implement the 3-to-2 capability of BCIMUX 222.

In addition to the address queuing provided by the three BCI queues (BCIDCQUEUE 224, BCIICQUEUE 223, and BCIPCQUEUE 225), the BCI control block, BCICTL 321, queues additional attributes of a queued memory access for provision to memory subsystem 241. Referring back to FIG. 3, BCICTL 321 queues the PCI or core source of a memory access and, in the case of transactions originating from the processor core, queues the instruction or data cache source. These memory access attributes are supplied to memory control unit 104 as the BCIMPXC and BCIMIXD signals on lines 310 and 311. BCICTL 321 also queues a BCIMMEM indication which, when provided on line 243, indicates a valid accesses to the memory address space. As previously discussed, BCIMMEM is deasserted as part of the process for dequeuing a memory access from memory subsystem 241. The BCIMCFG signal is analogous, but indicates a valid access to the configuration address space. BCICTL 321 further queues 16-bit access, burst access, and read vs. write access indications, for provision to memory subsystem 241 as the BCIMD16, BCIMBURST, and BCIMRXW signals on lines 313,314, and 315, respectively. These queued attributes, together with the memory address queued at BCIPCQUEUE 225, allow BCI 120 to requeue a memory access at memory subsystem 241 after a cache miss at data cache 102.

Figures 3, 3A, 4, 5:
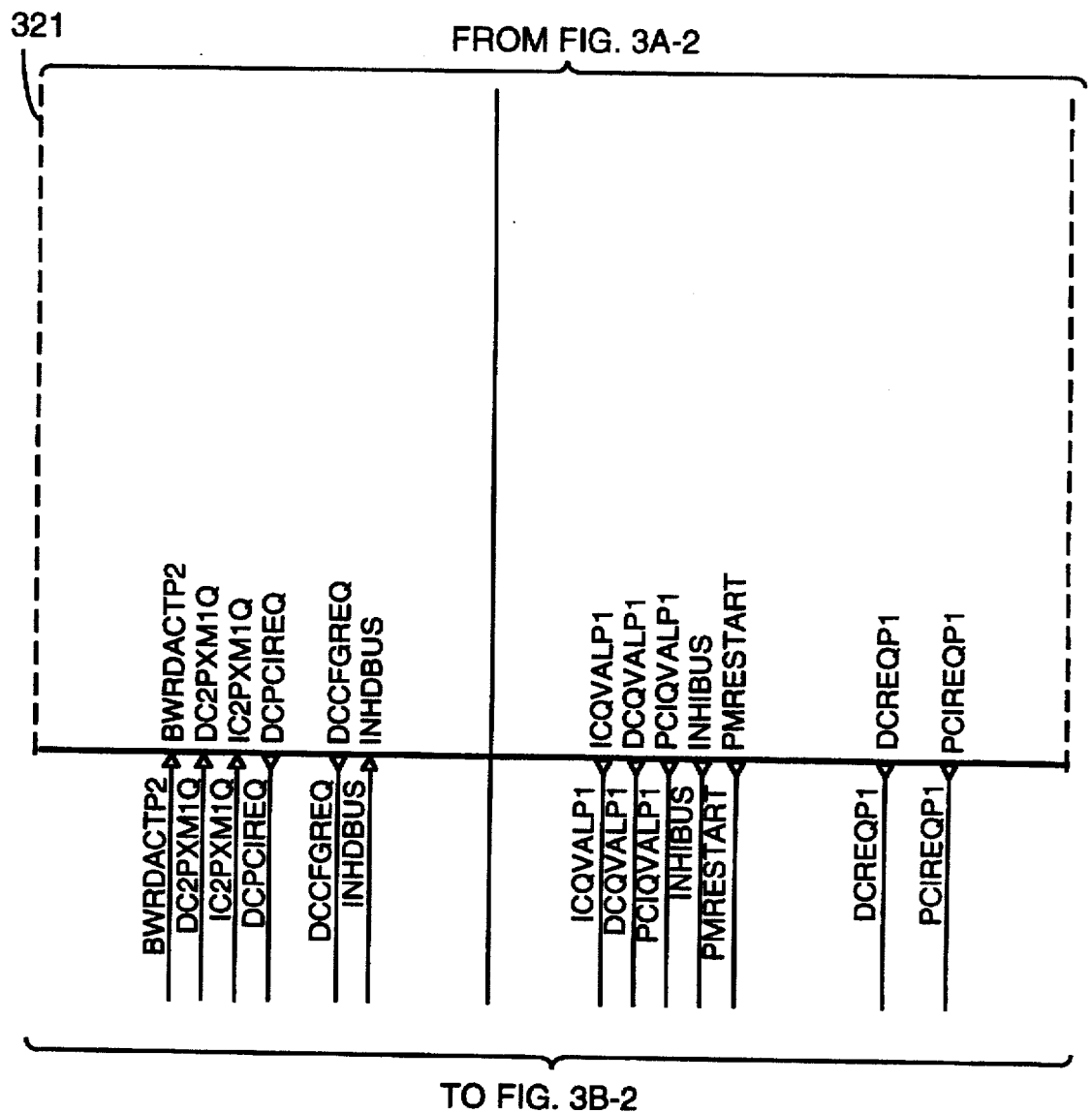

The flow chart of FIG. 5 illustrates, in accordance with the structures of FIGS. 2, 3, and 4, the operation of transparent burst access to data having a portion residing in cache and a portion residing in memory. In particular, FIG. 5 illustrates transparent burst access to data distributed between data cache 102 and memory 201. PCI agent 202 initiates a memory read request via PCI bus 203 and PCI bridge 105. In the context of the exemplary embodiment of FIG. 3, PCI bridge 105 forwards a memory read request initiated by PCI agent 202 and targeting addressable memory locations represented in memory 201 and/or data cache 102 by supplying a PCIREQ signal on line 306 and a PCIRXW indication selective for read on line 305. Responsive to the read request of step 502, BCI 120 (illustratively BCICTL block 321) grants DBUS 235 to PCI bridge 105 in step 503. After BCI 120 grants DBUS 235 to PCI bridge 105, the incoming memory address is supplied from PCI bridge 105 via BCIPD bus 234 and driven by BCIDRV 221 onto DBUS 235 for use by data cache 102. Coincident with the driving of the incoming address onto DBUS 235, BCI 120 (i.e., BCICTL 321) signals data cache 102 that a PCI memory read accesses is beginning by supplying the bus watching read request signal (REQBWRD) on line 301. Also coincident with the driving of the incoming address onto DBUS 235, BCI 120 supplies the incoming address to memory subsystem 241 via BCIPCQUEUE 225, BCIMUX 222, and BCIMADDR bus 231. BCIPCQUEUE 225 also stores a local copy incoming address for incrementing and later use in requeuing the memory access after a cache miss.

In the exemplary embodiment of FIGS. 2, 3, and 4, BCIPD bus 234 distributes the incoming address to both data cache 102 and memory subsystem 241. In particular, BCIDRV 221 receives the incoming address from BCIPD bus 234 and drives the incoming address onto DBUS 235. BCIPCQUEUE 225 also receives the incoming address from BCIPD bus 234 and supplies the incoming address on BCIMADDR bus 231 via BCIMUX 222. As previously described, BCIPCQUEUE 225 also queues the incoming address for later provision to memory subsystem 241. Data cache 102, after receiving the incoming address on DBUS 235, checks the incoming address against its associated tag store. If the incoming address matches a tag in the associated tag store, signifying a cache hit, data cache 102 asserts the data cache data intervention (DCDI) signal on line 244 (see step 507). Responsive to the assertion of the DCDI signal, BCI de-queues the memory access queued for memory subsystem 241 by de-asserting the PCIMMEM signal (see step 508). BCI 120 then signals that PCI is ready for data by asserting the BIUDRDY signal (see step 521), whereupon data cache 102 drives the addressed data onto DBUS 235 (see step 522). Also responsive to the BIUDRDY signal, data cache 102 increments its local copy of the next address (see step 528). Data cache 102 stores the current address and uses a counter responsive to BIUDRDY to create next addresses. If the next address begins a new block, then, upon the assertion of BIUDRDY, the next address is supplied to the tag store of data cache 102 for comparison. In a presently preferred embodiment, the next address is available before BIUDRDY is asserted, so as to enable rapid supply of next addresses to the tag store. A variety of suitable embodiments for precomputing the next address will be apparent to those of ordinary skill in the art. For example, dual counters may be provided. Alternatively, adder logic may be coupled to the outputs of a single counter and the sum latched for provision to the tag store. Data cache 102 includes any such suitable counter logic.

Coincident with the provision of BIUDRDY, BCI 120 increments its local copy of the next address (see step 527). Steps 522, 527 and 528 are coincident with each other and no particular ordering is required as long as data cache 102 drives the previously addressed data onto the data bus and the local copies of the next address residing at BCI 120 and at data cache 102 are incremented to indicate the subsequent address. Incrementing of address values is in accordance with any suitable burst ordering, including sequential ordering and 486 burst ordering.

The burst access is terminated upon receipt of a termination signal from PCI bridge 105 (see step 523). However, unless terminated, burst access continues with the next addressed memory location. On a cache line boundary, data cache 102 checks its incremented local copy of the next address against its associated tag store (see decision point 525). If a match occurs, the next addressed memory block is also represented in data cache 102 and data will continue to be supplied from data cache 102. BCI 120 asserts BIUDRDY to signal that PCI is ready for the additional data (step 521) and the process continues until either the burst access is terminated (see decision point 523) or the next addressed memory block is no longer represented in data cache 102 (see decision point 525).

Many suitable data caches are managed on a cache line basis. As a result, a cache line hit corresponding to a word in a given cache line can obviate checks for additional words within the same cache line. Illustratively, in a cache configuration wherein each cache line consists of four 32-bit words, and tag check for the first addressed word of a given cache line will be sufficient to establish the presence of the remaining words of the cache line in the cache. Naturally, such a system must either disable or detect the elimination of a cache line from the cache so as to ensure that subsequent words of a cache line remain available. Suitable designs for caches including designs for dual- or multi-ported caches are well known in the art. Cache 102 and tag comparison logic supportive of the "still in cache?" determination of step 525, are of any suitable design.

If the next addressed memory block is not represented in data cache 102 (see step 525) (i.e., if a lookup of the next address in data cache 102's associated tag store returns a cache miss indication), data cache 102 de-asserts the DCDI signal in step 529. Responsive to the de-assertion of DCDI, BCI 120 requeues a memory access starting at the next address for provision to memory subsystem 241. In the embodiment of FIGS. 2, 3, and 4, BCI 120 asserts the PCIMMEM signal (indicating that the local copy of the next address is valid) and supplies that next address on BCIMADDR bus 231 via BCIMUX 222. See steps 519 and 520. BCI 120 then signals that PCI is ready for data by asserting the BIUDRDY signal. As before, the BIUDRDY signal is supplied to data cache 102 and to memory subsystem 241 via lines 245 and 243, respectively. Responsive to the BIUDRDY signal, memory subsystem 241 drives the addressed data onto BCIMD bus 232 and data cache 102 increments its local copy of the next address. See steps 510 and 516. BCI 120's local copy of the next address is also responsive to the BIUDRDY signal, incrementing coincidently with the provision of data by memory subsystem 241 and with the incrementing of data cache 102's local copy of the next address. See step 515. At decision point 511, the ongoing burst access is terminated upon receipt of a termination signal from PCI bridge 105. Alternatively, the burst access may continue, whereupon data cache 102 checks its now incremented local copy of the next memory block address against its associated tag store. If the next addressed memory block is not represented in cache, the servicing of burst memory transactions by memory subsystem 241 continues with step 509.

Figure 5A:
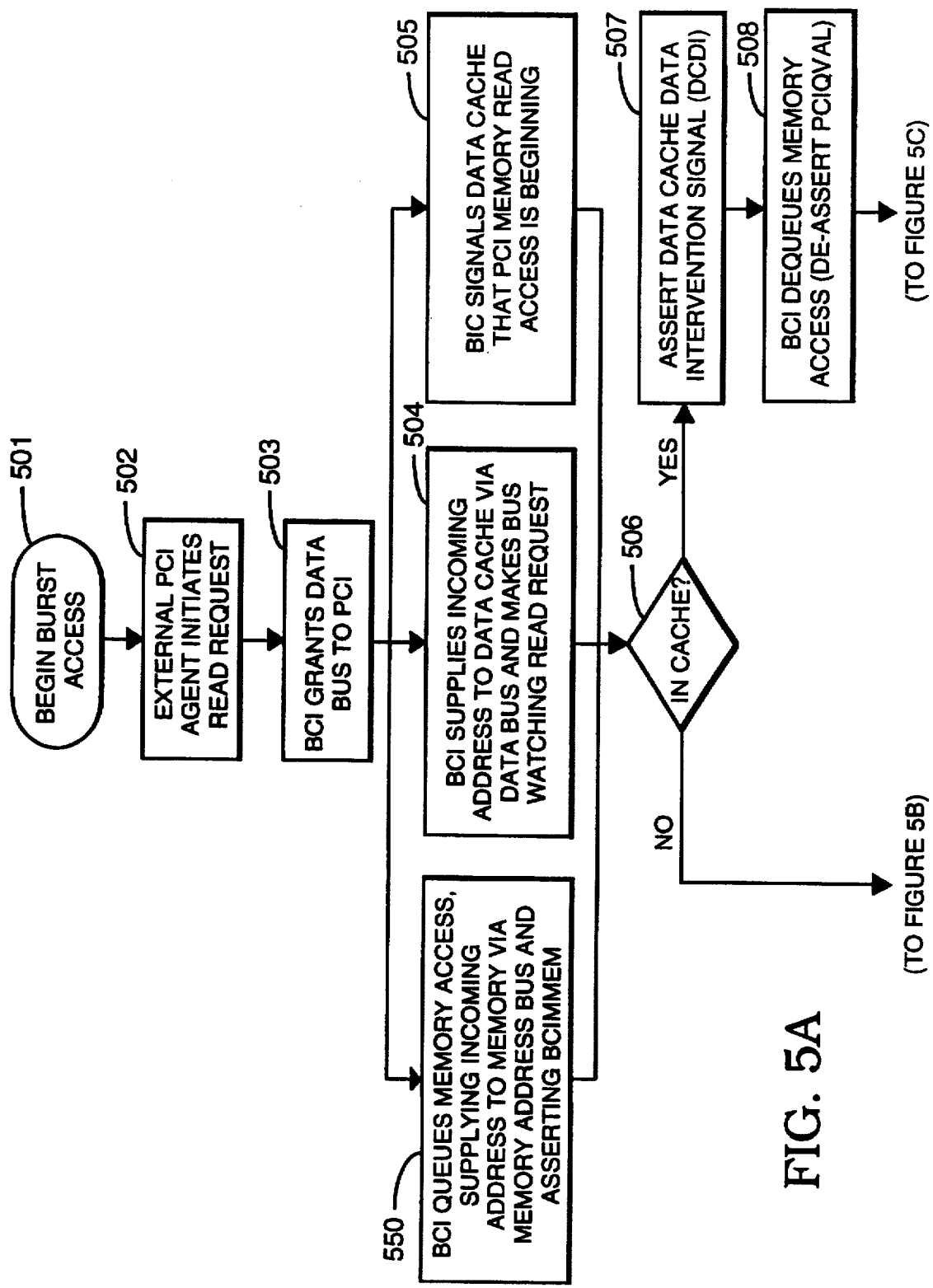
FIGS. 5A, 5B, and 5C are a flow diagram illustrating steps in a method for performing a bus watching read, multiple word access in accordance with an embodiment of the present invention.
Figure 5B:
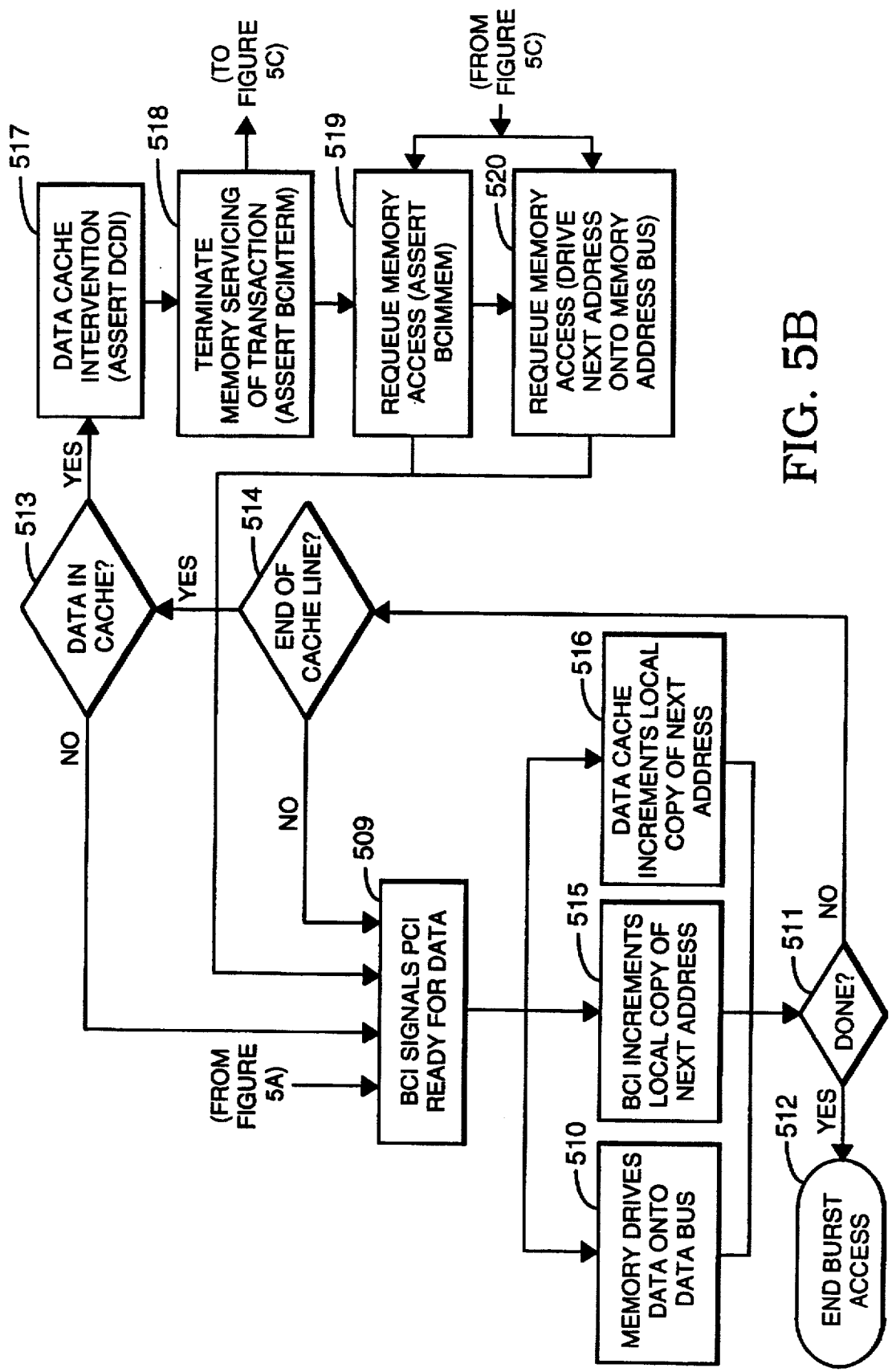
Figure 5C:
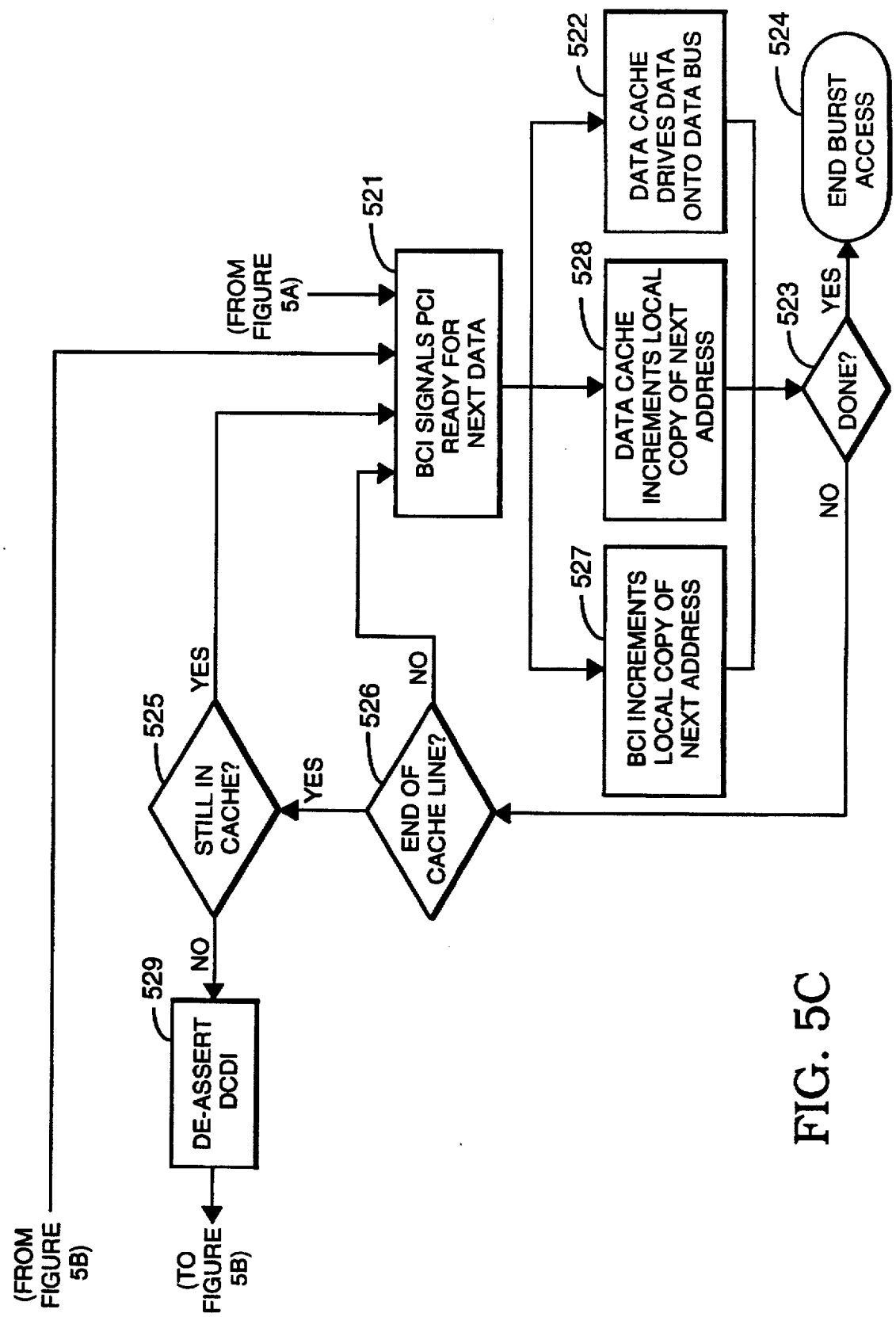
Figure 6:
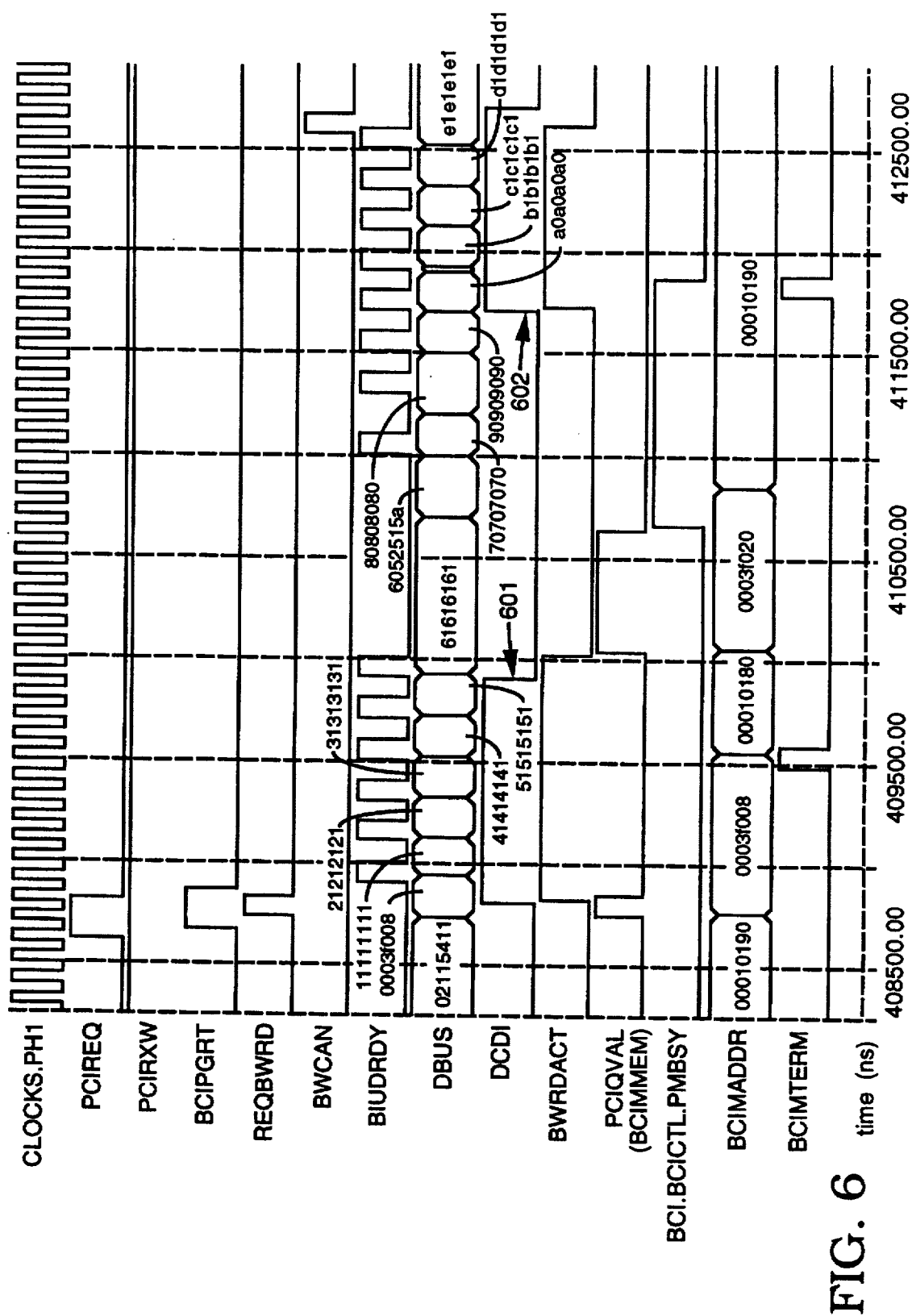

BCI 120 signals that PCI is ready for more data by asserting the BIUMRDY signal and subsequent accesses of the burst transaction continue to be serviced by memory subsystem 241. Servicing of subsequent accesses by memory subsystem 241 continues until the burst transaction is terminated at decision point 511 or steered to data cache 102 at decision point 513. If data cache 102 determines that the next addressed memory block is represented in cache (see decision point 578), data cache 102 intervenes by asserting the DCDI signal in step 517. Responsive to the DCDI signal, BCI 120 asserts a termination signal (BCIMTERM), illustratively on line 242, thereby terminating subsequent transfers from memory subsystem 241. BCI 120 signals that PCI is ready for data by asserting the BIUDRDY signal. The burst memory access is then serviced via data cache 102 as described above until a burst access termination signal is received from PCI bridge 105, thereby ending the burst access, or until a block in the sequence of addresses addressed in a given burst is not represented in the cache, whereupon the burst access is instead serviced by memory subsystem 241 as previously described with reference to FIG. 5B. In this way, the structures presented in FIGS. 2, 3, and 4 transparently steer individual memory block accesses of a burst data transfer back and forth between a data cache such as data cache 102 and a memory subsystem such as memory subsystem 241.

Figures 3, 3A, 4, 5, 6:
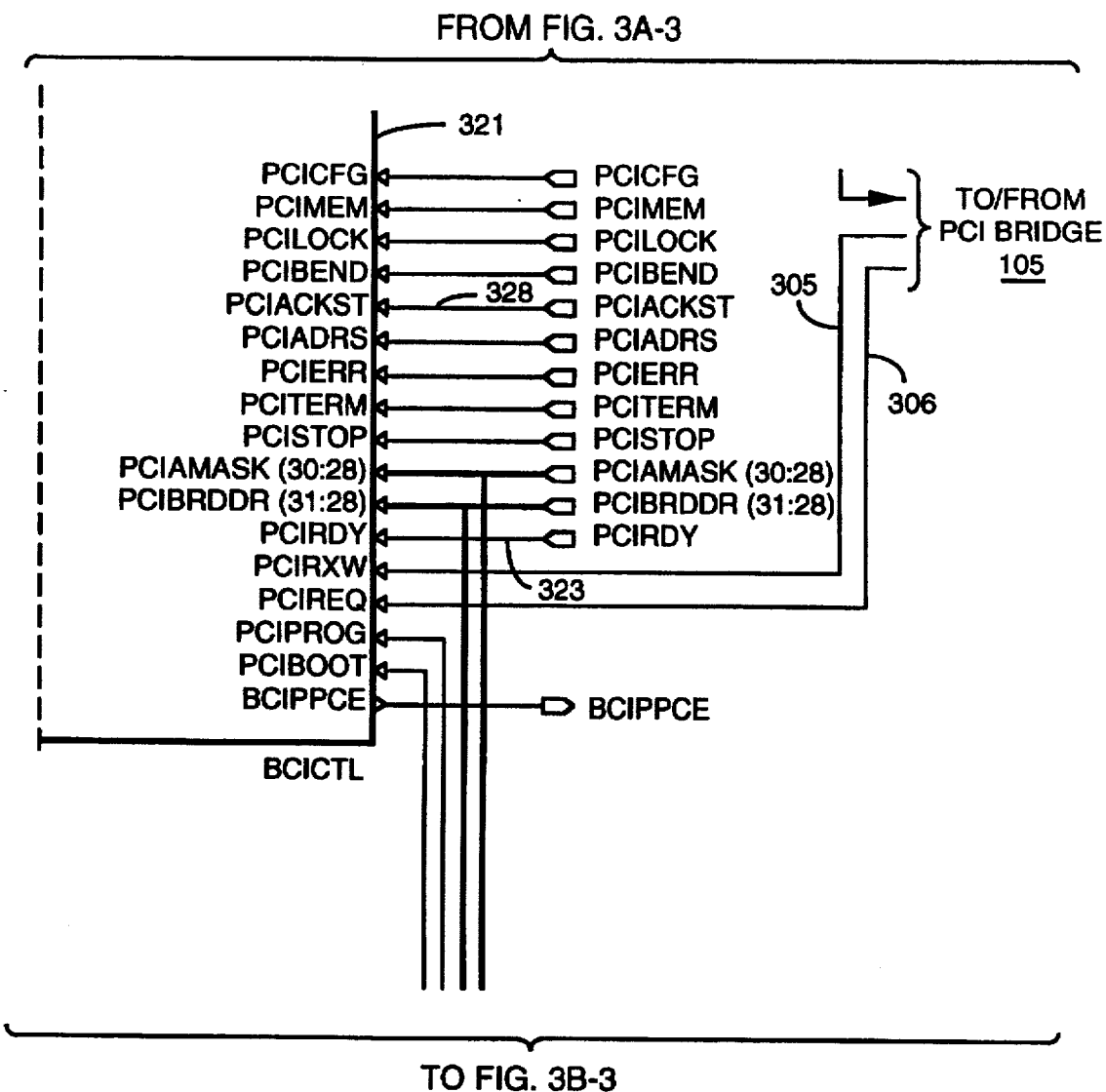
FIG. 6 is a timing diagram for a bus watching read, multiple word access performed in accordance with an exemplary embodiment of the present invention.
Figures 1, 3B:
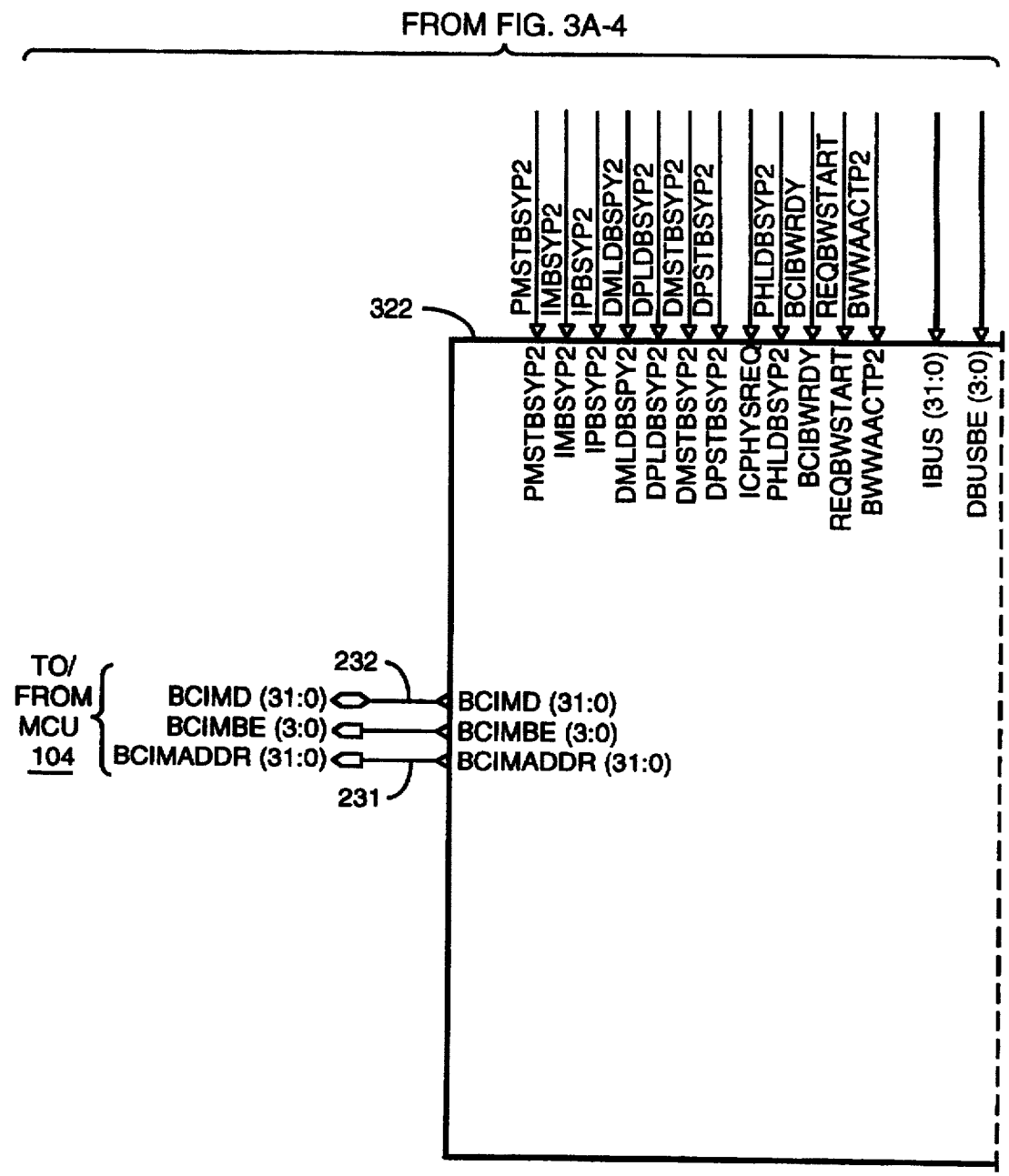
Figures 2, 3B:
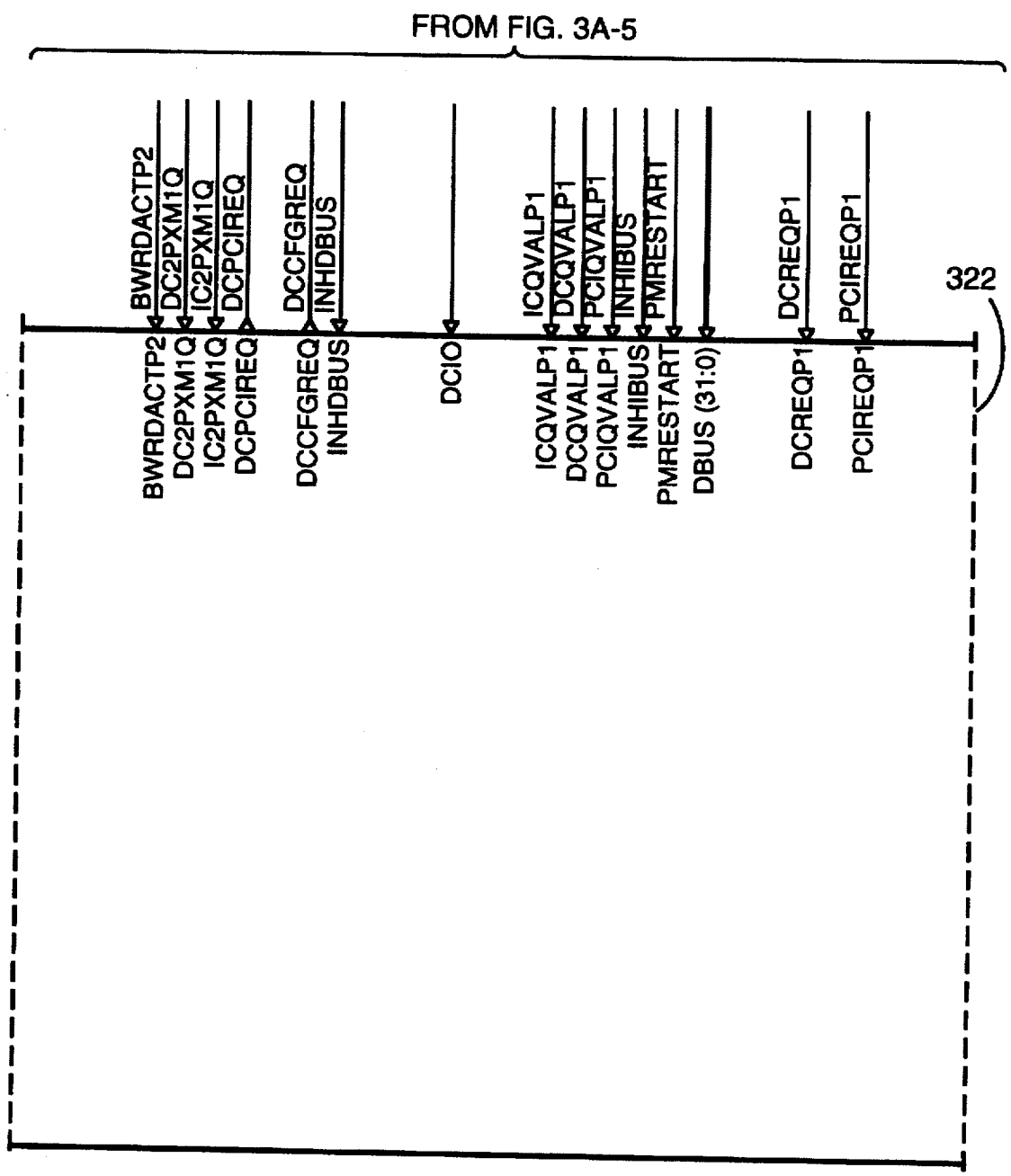
Figures 3, 3B:
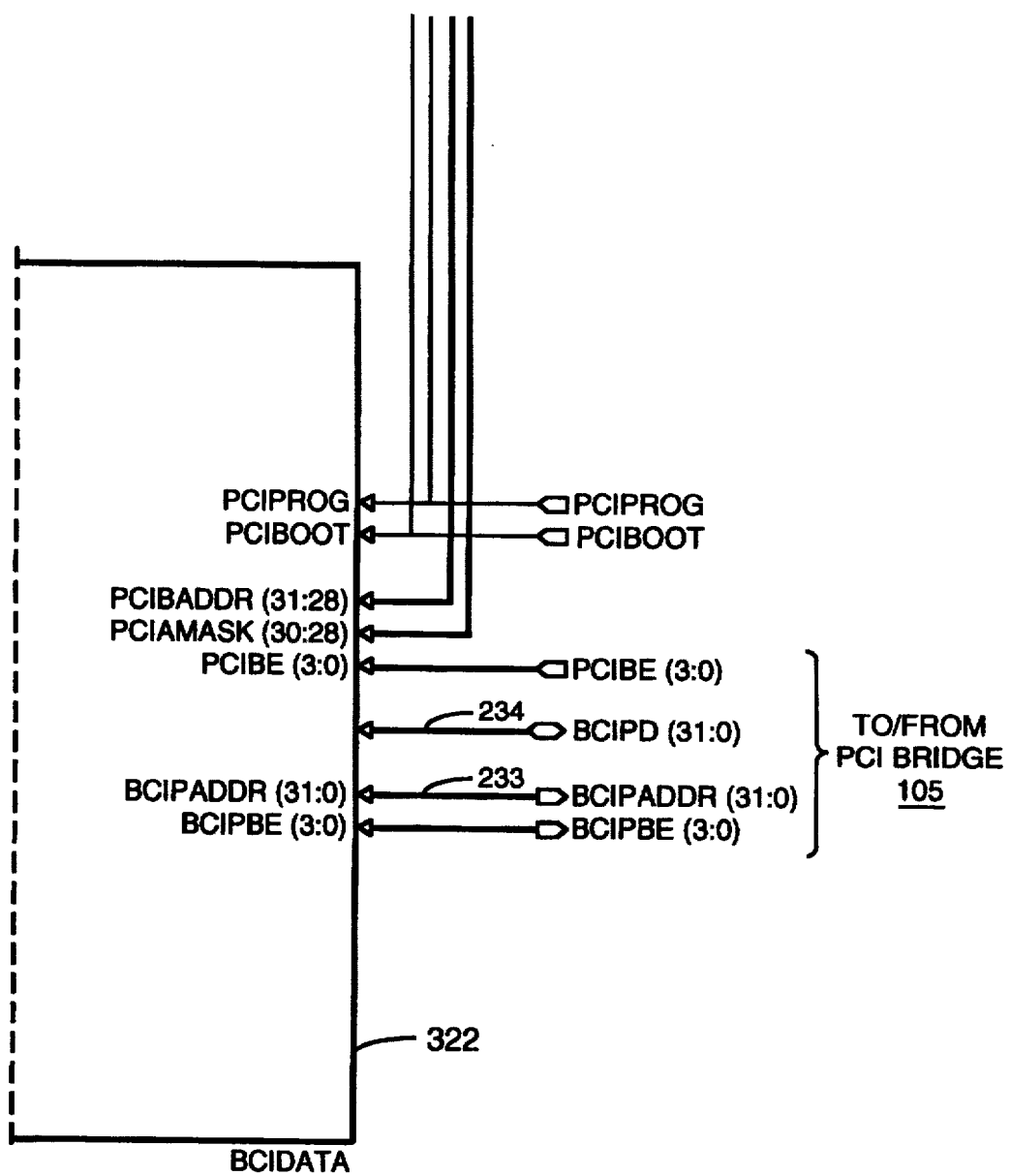
Figure 4A:
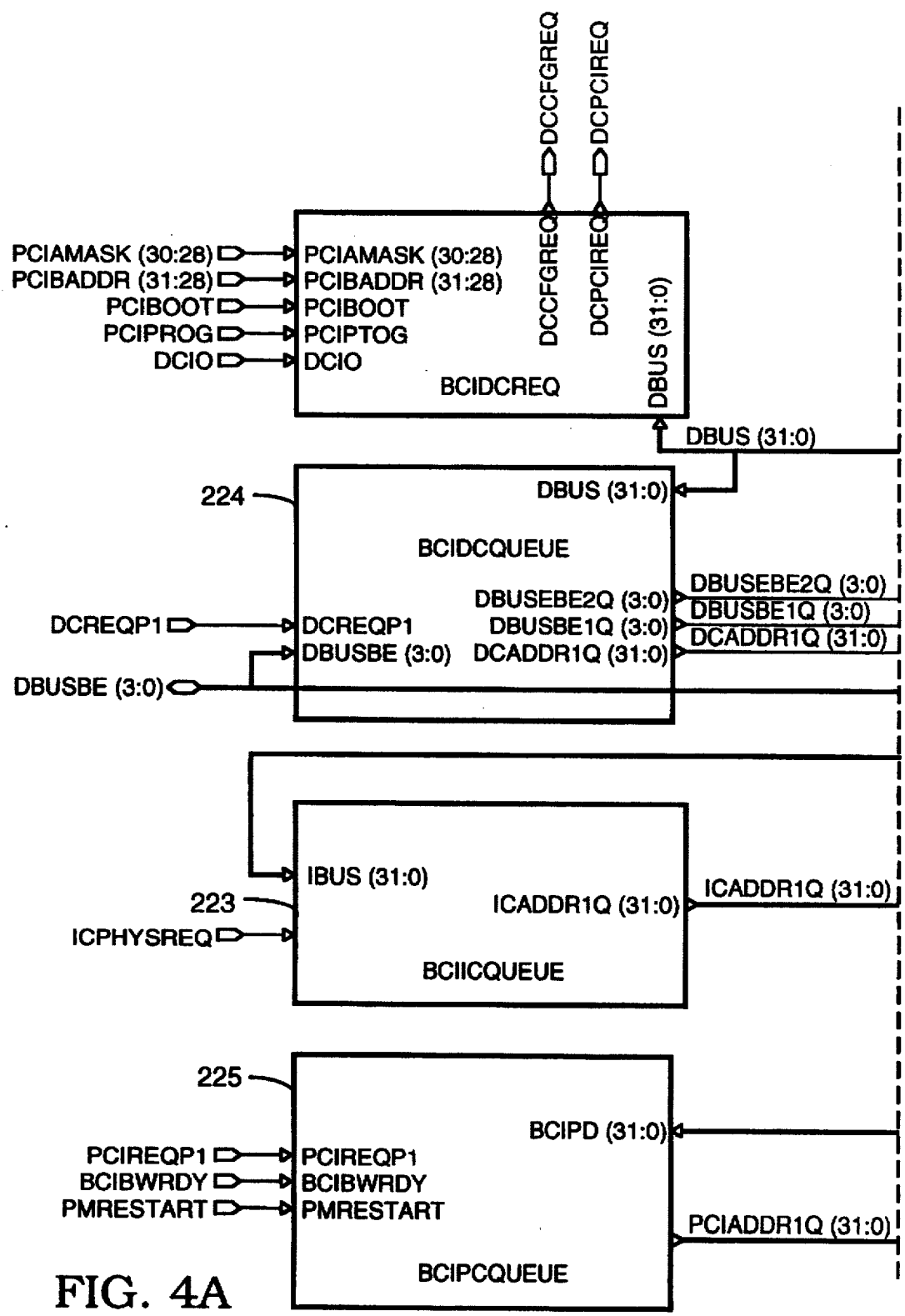
FIGS. 4A, 4B, and 4C are detailed block diagrams respectively depicting portions of the data portion of a bus/cache/memory interface in accordance with an exemplary embodiment of the present invention.
Figure 4B:
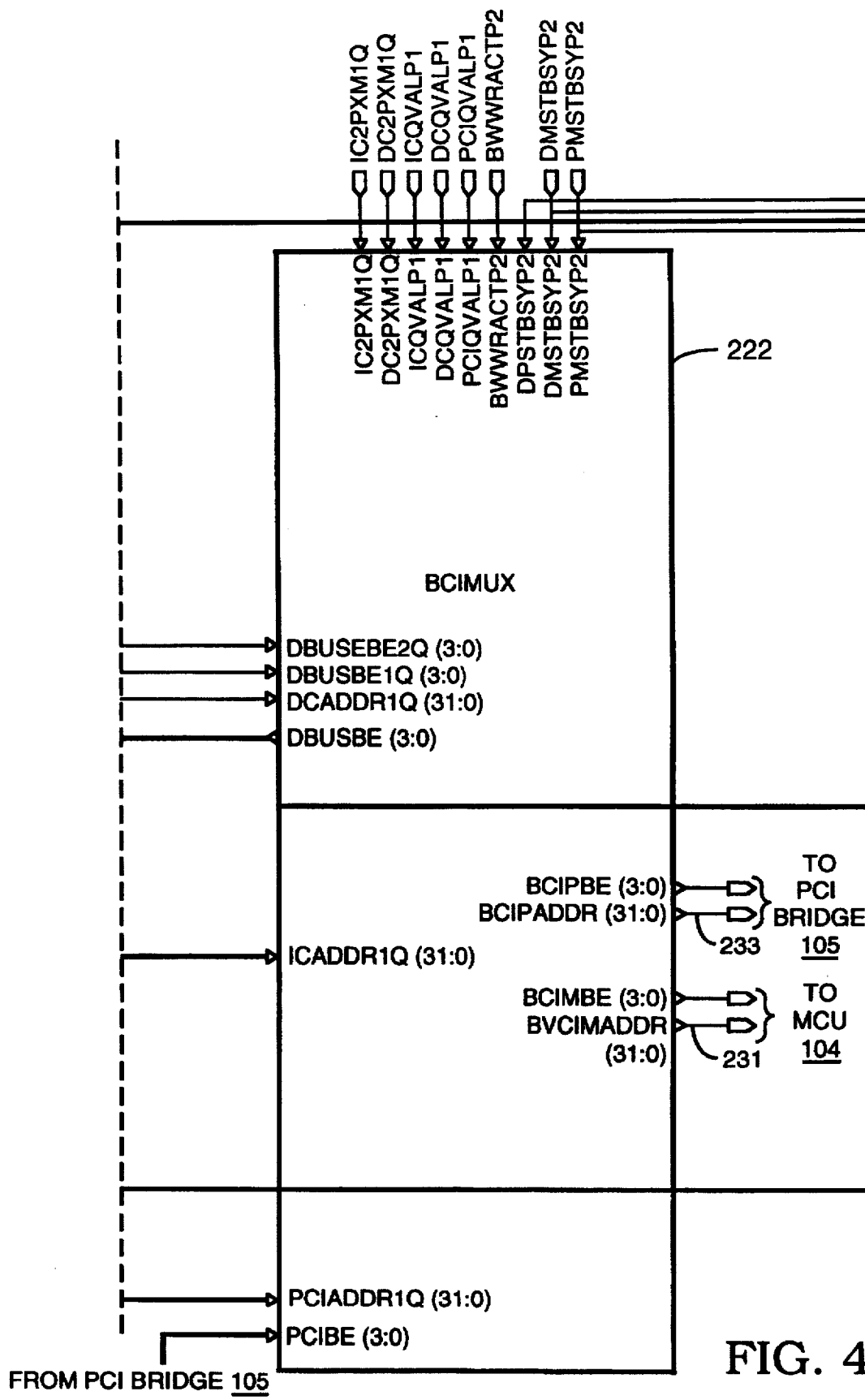
Figure 4C:
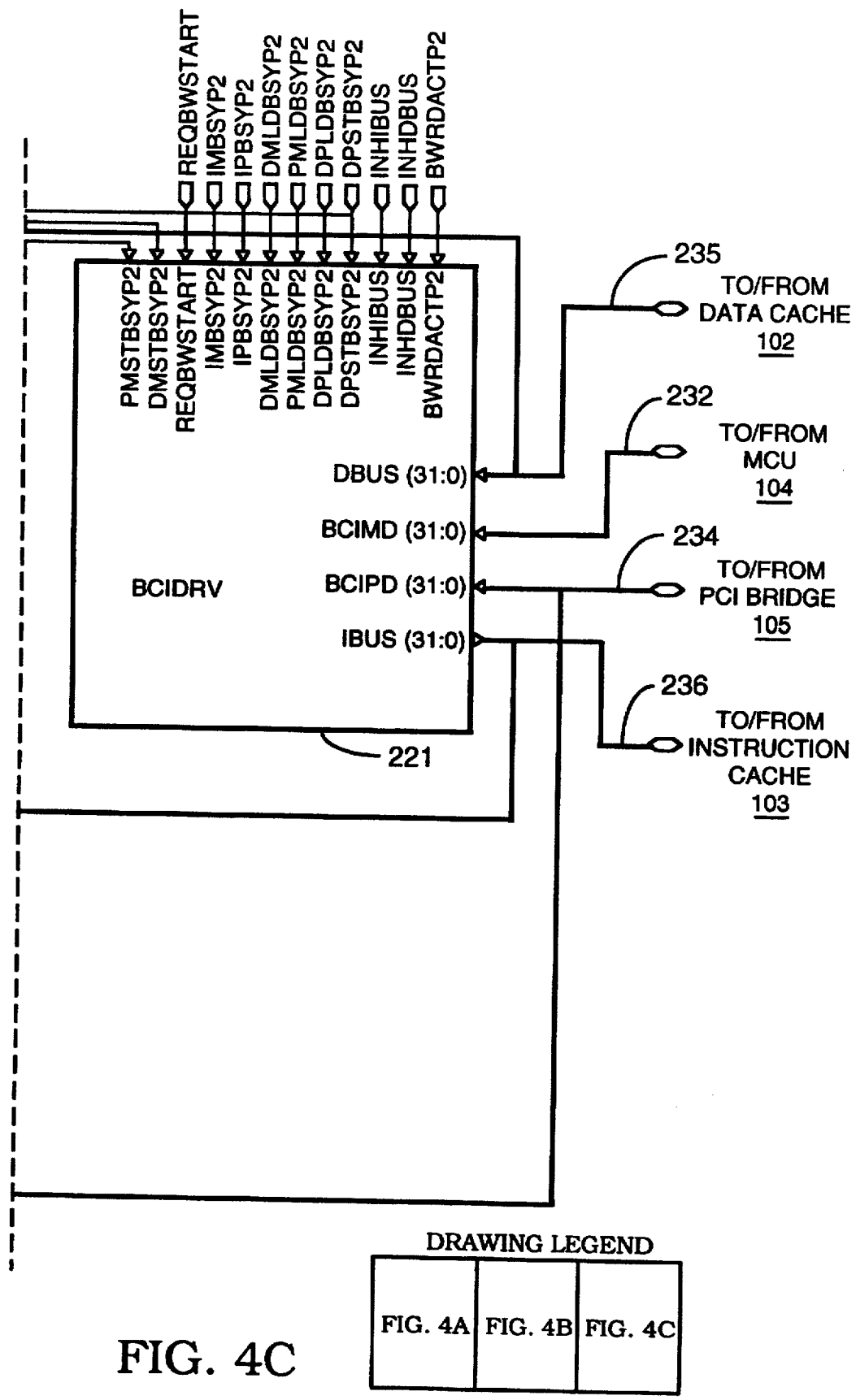

FIG. 6 is a timing diagram further depicting signal timings for the servicing of a burst read transaction by system such as that depicted in the exemplary embodiments of FIGS. 2, 3, and 4, and in accordance with the sequence of operations shown in the flow chart of FIG. 5. Illustratively, a PCI agent (e.g., PCI agent 202) makes a read request (PCIREQ and PCIRXW) via PCI Bridge 105 (recall FIG. 2) which is received by BCI 120. BCI 120 allocates DBUS 235 to PCI (i.e., to PCI bridge 105 on behalf of PCI agent 202), signaling this allocation by asserting the BCIPGRT signal. The phase after BCI 120 asserts the BCIPGRT signal, BCIDRV 221 receives the incoming memory read address from PCI Bridge 105 via BCIPD bus 234 (trace not shown) and drives the address (0x3f008) onto DBUS 235. Memory control unit 104 also receives the incoming memory read address via BCIPCQUEUE 225, BCIMUX 222 and BCI-MADDR bus 231 (see FIG. 2). By asserting the REQBWRD signal, BCI 120 signals data cache 102 that a PCI-to-memory read access is beginning.

Data cache 102 looks up (in its associated tag store) the memory read address supplied by BCI 120. If a comparison match occurs, data cache 102 asserts the data cache data intervention signal (DCDI) during the cycle following the REQBWRD. Since data cache 102 is intervening and will supply data at least to the end of the cache block, the access that was originally targeted for memory 201 is de-queued (i.e., BCIMMEM de-asserts). The cycle following assertion of DCDI, data cache 102 drives the addressed data onto DBUS 235 in response to the assertion of the ready signal (BIUDRDY). BCI 120 signals data cache 102 that PCI bridge 105 received the data and is ready for the next data by asserting BIUDRDY. Subsequent data for the burst read access are supplied for each assertion of the BIUDRDY, as shown in FIG. 6.

Both BCI 120 and data cache 102 maintain local copies of the next address. Data cache 102 maintains a copy so that it knows the memory address of the next data word to drive onto DBUS 235 and so that, upon crossing a cache line boundary, data cache 102 can compare the next block address to its associated tag store during the servicing of burst address to detect a cache miss. BCI 120 maintains a copy because data cache 102 may not hit in the next cache block though PCI agent 202 may require subsequent data as part of the pending burst read access. When data cache 102 misses, BCI 120 must re-queue the memory access with the then current memory read address. Both the data cache 102 and BCI 120 copies of the next address are incremented in response to BIUDRDY assertions. Once data cache 102 matches an address in its tag store, it asserts DCDI until the last word of the cache block is driven onto DBUS 235. If, beginning with the first word of the next cache block, data cache 102 also matches the next address in its tag store (i.e., if data cache 102 continues to hit), DCDI remains asserted through the next cache block. If, instead, the next cache block is a cache miss, data cache 102 de-asserts DCDI, signaling BCI 120 that it must requeue a memory access for servicing by memory 201. In the illustrative timing diagram of FIG. 6, data cache 102 de-asserts DCDI at 601 (i.e., at simulation time 409900).

The operation of BCI 120, transparently steering a 14-word, burst read access between data cache 102 and memory 201, is illustrated in to FIG. 6. PCI bridge 105 makes a memory read request (PCIREQ and PCIRXW) at stimulation time 408600. BCI 120 relates the memory read request to data cache 102 by asserting REQBWRD during the following cycle and by driving the corresponding memory read address, 0x3f008, received from PCI bridge 105 onto DBUS 235 at stimulation time 408700. Data cache 102 compares the memory read address to its tags and asserts DCDI the following cycle (indicating a cache hit). In response to the DCDI assertion, BCI 120 de-queues the memory access. As previously indicated, the BCIMMEM signal is supplied to memory subsystem 241 and, when de-asserted, dequeues the pending memory access. The local (BCI) signal, PCIQVAL, which transitions coincident with the BCIMMEM signal, should be viewed illustratively as a surrogate for BCIMMEM in the trace of FIG. 6. PCIQVAL (and BCIMMEM) is asserted by BCI 120 (and the memory read address is supplied to memory 201 on BCIMADDR bus 231) at simulation time 408700 in anticipation of the possibility that data cache 102 may miss.

Data cache 102 supplies, and PCI bridge 105 receives, the first two words (denoted 11111111 and 21212121) of the 14-word burst beginning at memory address 0x3F008. These first two words (at memory addresses 0x3f008 and 0x3f00C) are the last two words in a cache block. When data caches drives out the last word in the cache block, DCDI remains asserted, indicating that data cache 102 has matched the next address, 0x3F010 (0x3F010=0x3F008+8), in its tag store and that data cache 102 will supply data for the next cache block, as well. Data cache 102 continues to supply new data (31313131, 41414141, 51515151, and 61616161) in response to each successive assertion of BIUDRDY in the ready train. Also in response to each successive assertion of BIUDRDY, data cache 102 and BCI 120 increment their respective local copies of the next address.

At the end of the second cache block, i.e., beginning with memory address 0x3f020, data cache 102 de-asserts the DCDI signal (at 601), signaling BCI 120 that the data for the next cache block does not reside in the data cache 102 (i.e., signaling a cache miss). Consequently, BCI 120 must now steer the read access to memory 201. During the cycle following DCDI de-assertion, BCI 120 asserts PCIQVAL (and BCIMMEM) and supplies the memory read address (0x3f020) for the next word in the burst access on BCI-MADDR bus 231. Memory control unit 104 receives the memory read address (0x3F020) on behalf of memory 201 and subsequently supplies data for this third (uncached) block of memory address. Memory control unit 104 supplies from memory 201 the addressed data (70707070) and subsequent data words (80808080, 90909090, and a0a0a0a0) in response to successive assertions of BIUDRDY in the ready train. In the illustration of FIG. 6, a delay of approximately 8 clock cycles is shown before the memory control unit 104 supplies the first data word (70707070) in the third block. The delay is independent of the transition from data cache 102 to memory 201 as the source for memory read data; instead, the delay reflects the simulation of the servicing (by memory 201) of an intervening cache line fill request by instruction cache 103 (activity on IBUS 236 is not shown in FIG. 6).

Returning then to the servicing of PCI agent 202's 14-word, burst read access, memory control unit 104 supplies the addressed data words (70707070, 80808080, 90909090, and a0a0a0a0) in response to successive assertions of BIUDRDY. Also responsive to successive assertions of BIUDRDY, BCI 120 and data cache 102 increment their local copies of the next address. At the last word of the 0x3f020 block (i.e., a0a0a0a0), data cache 102 asserts DCDI signaling BCI that the data associated with the memory block address 0x3f030 resides in data cache 102. The following phase, BCI stops the memory subsystem 241 access by asserting the BCIMTERM signal. During the immediately following phase 1, data cache 102 begins supplying data on DBUS 235. Note that there are no gaps in the BIUDRDY train between the transition from servicing by memory 201 to servicing by data cache 102. BCI 120 finally ends the burst read access at simulation time 412600 by asserting the BWCAN signal.

Figure 7:
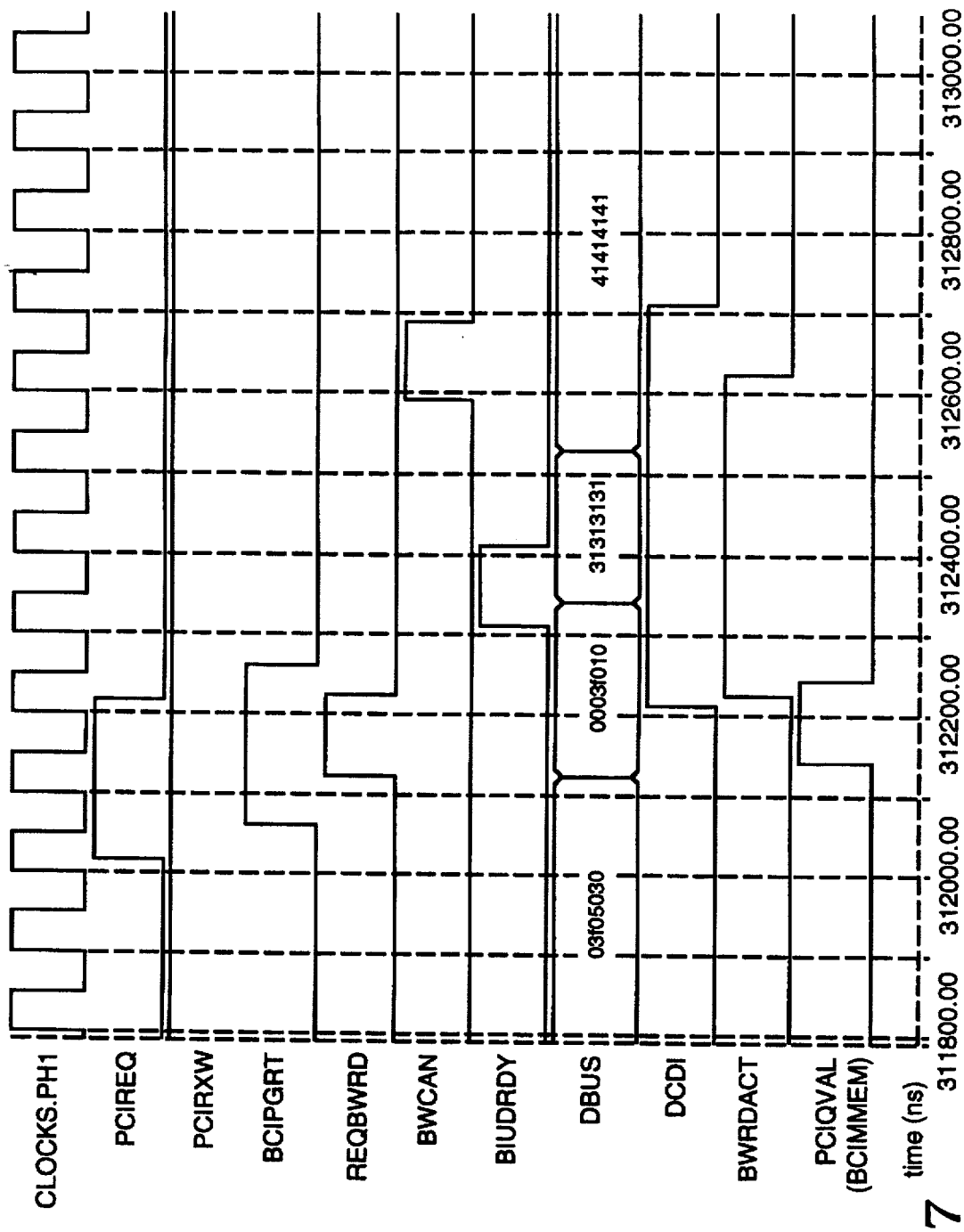
FIG. 7 is a timing diagram for a bus watching read, single word access performed in accordance with an exemplary embodiment of the present invention.

FIG. 7 is a timing diagram further depicting signal timings for the servicing of a single word, bus watching read transaction by a system such as that depicted in the exemplary embodiments of FIGS. 2, 3, and 4, and in accordance with the sequence of operations shown by the flow chart of FIG. 5. Illustratively, a PCI agent (e.g., PCI agent 105) makes a read request (PCIREQ and PCIRXW) via PCI bridge 105 (recall FIG. 2) which is received by BCI 120. BCI 120 allocates DBUS 235 to PCI (i.e., to PCI bridge 105 on behalf of PCI agent 202), signaling this allocation by asserting the BCIPGRT signal. The phase after BCI 120 asserts the BCIPGRT signal, BCIDRV 221 receives the incoming memory read address from PCI Bridge 105 via BCIPD bus 234 (trace not shown) and drives the address (0x3f010) onto DBUS 235. Memory control unit 104 also receives the incoming memory read address via BCIPCQUEUE 225, BCIMUX 222 and BCIMADDR bus 231 (see FIG. 2). By asserting the REQBWRD signal, BCI 120 signals data cache 102 that a PCI-to-memory read access is beginning.

Data cache 102 looks up (in its associated tag store) the memory read address supplied by BCI 120. If a comparison match occurs, data cache 102 asserts the data intervention signal (DCDI) during the cycle following the REQBWRD. Since data cache 102 is intervening and will supply the data word, the access that was originally targeted for memory 201 is de-queued, i.e., PCIQVAL and BCIMMEM de-assert. During the cycle following assertion of DCDI, data cache 102 drives the addressed data (31313131) onto DBUS 235 in response to the assertion of the BIUDRDY signal. The single word access from data cache 102 ends when BCI 120 asserts the BWCAN signal. If the data associated with the memory read address has not been represented in data cache 102 (i.e., if data cache 102 had not asserted DCDI), the memory access from memory 201 would not have been de-queued, i.e., PCIQVAL (and BCIMMEM) would have remained asserted, and memory 201 would have serviced the memory read request. Implementation of a single-word, bus watching read transaction is analogous to that of a multi-word, bus watching read transaction, but with a much earlier assertion of the BWCAN signal.

Figure 8:
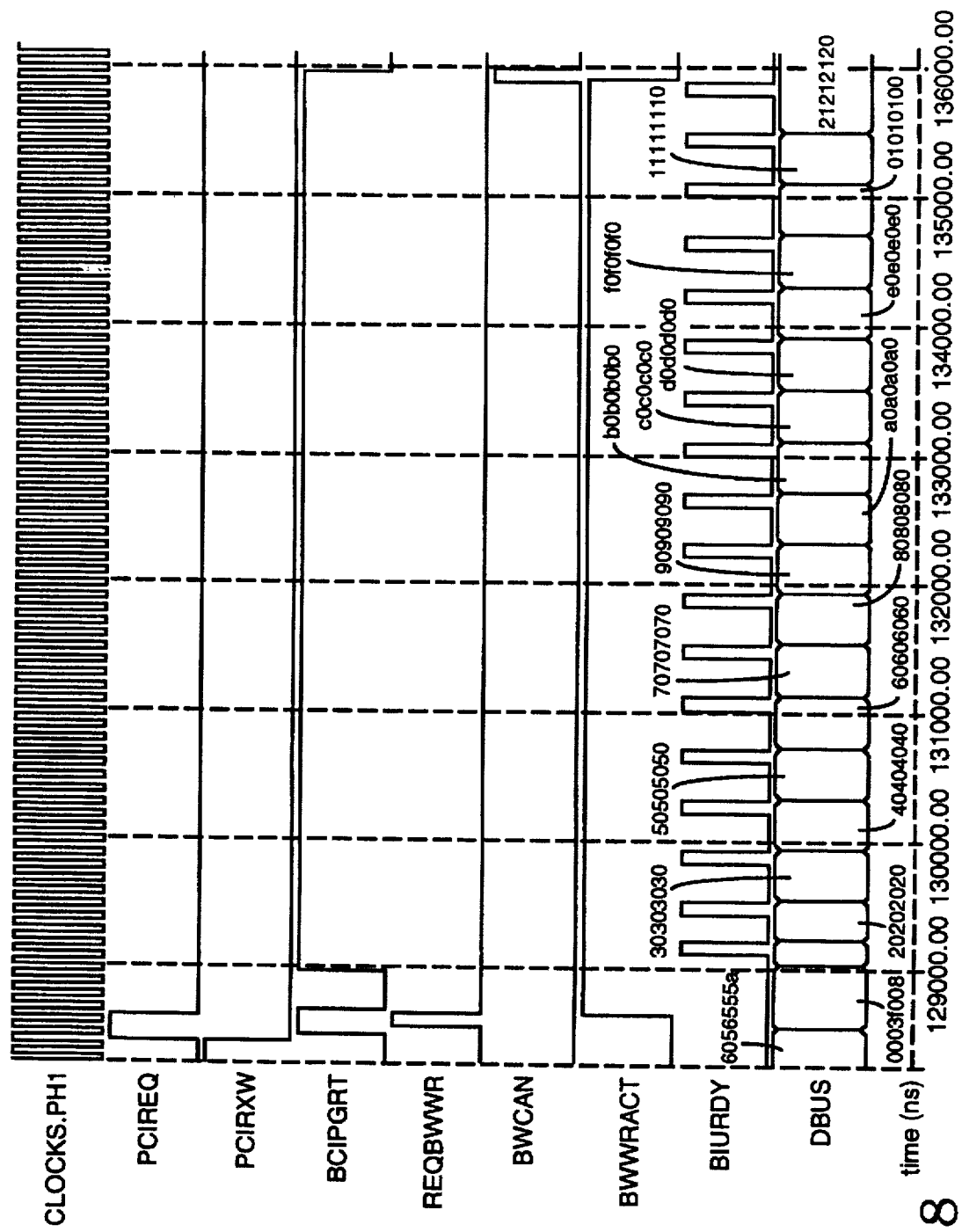
FIG. 8 is a timing diagram for a bus watching write performed in accordance with an exemplary embodiment of the present invention.

Although read transactions present the primary challenge for transparent handling of burst data transfers, BCI 120, also provides support for single- and multi-word bus watching write transactions as illustrated in the timing diagram of FIG. 8. In particular, FIG. 8 depicts signal timings for the servicing of a burst write transaction in a system such as that depicted in the exemplary embodiments of FIGS. 2, 3, and 4.

Illustratively, a PCI agent (e.g., PCI agent 202) makes a write request (PCIREQ and PCIRXW) via PCI bridge 105. BCI 120 allocates DBUS 235 to PCI (i.e., to PCI bridge 105 on behalf of PCI agent 202), signaling this allocation by asserting the BCIPGRT signal. The phase after BCI 120 asserts the BCIPGRT signal, BCIDRV 221 receives the incoming memory write address from PCI Bridge 105 via BCIPD bus 234 (trace not shown) and drives the address (0x3f008) onto DBUS 235. Memory control unit 104 also receives the incoming memory write address via BCIPCQUEUE 225, BCIMUX 222 and BCIMADDR bus 231 (see FIG. 2). By asserting the REQBWWR signal, BCI 120 signals data cache 102 that a PCI-to-memory write access is beginning. Memory write data received from PCI agent 202 are supplied by BCI 120 on both DBUS 235 and BCIMD bus 232 (trace not shown). Referring back to FIG. 2, in a presently preferred embodiment, memory write data are driven by BCIDRV 221 from BCIPD bus 234 to DBUS 235 and from DBUS 235 to BCIMD bus 232, so as to reduce driver fanout.

Data cache 102 looks up (in its associated tag store) the memory write address supplied by BCI 120. If a comparison match occurs, data cache 102 will update the corresponding data in data cache 102 with the write data subsequently appearing on DBUS 235. BCI 120 signals data cache 102 that there is valid data on DBUS 235 by asserting the BIUDRDY signal. In the illustrative timing diagram of FIG. 8, a 17-word burst write transaction is shown. Each successive assertion of the BIUDRDY signal indicates the validity of successive data words on DBUS 235. As with the read transactions described above, data cache 102 increments its local copy of the next address in response to each successive assertion of the BIUDRDY signal. Data cache 102 updates its cached data representations with data from DBUS 235 (e.g., 20202020, 30303030, 40404040, . . . , and 21212121) when the local copy of the next block address matches an entry in the tag store (i.e., on a cache hit). The PCI/memory write access and bus watching ends when BCI 120 asserts the BWCAN signal.

While the invention has been described with reference to various embodiments, it will be understood that these embodiments are illustrative and that the scope of the invention is not limited to them. Many variations, modifications, additions, and improvements of the embodiments described are possible. For example, those skilled in the art will recognize that the coupling of BCI 120 to a discrete bridging device such as PCI Bridge 105 is merely illustrative as PCI bridges are well known in the art. Alternative embodiments may integrate the structures and/or functionality of BCI 120 into an integrated Host/PCI Cache/Bridge. Furthermore, the particular signals and timings depicted in FIGS. 6, 7 and 8 are merely illustrative of suitable signals, timings and dependencies for providing a bus watching, multiple word read and write accesses in accordance with the present invention; myriad alternate implementations will be appreciated by those of ordinary skill in the art. In addition, alternative embodiments may discontinue a burst memory access at a memory subsystem such as 241 by supplying a termination signal to the memory subsystem, by dequeuing a burst memory access queued for the memory subsystem, or by a combination of dequeuing queued memory accesses and terminating ongoing memory accesses.

Additionally, structures and functionality presented as hardware in the exemplary embodiment may be implemented as software, firmware, or microcode in alternative embodiments. Similarly, functionality illustrated as sequences of operations and/or methods may be provided by specialized logic, by firmware or microcode, or as software on a programmed general purpose processor. The breadth of suitable implementations of structures and functionality described herein will be apparent to those of ordinary skill in the art. These and other variations, modifications, additions, and improvements may fall within the scope of the invention as defined in the claims which follow.

What is claimed is:

1. In a computer system having a memory subsystem, a cache, and a bus agent, wherein the memory subsystem represents data associated with a plurality of addressable memory locations, wherein the cache represents cached data associated with certain of the addressable memory locations, and wherein the bus agent initiates access to a data block at least a portion of which is represented in the cache, a bus control interface comprising:

a first address receiving port and a first data providing port respectively coupled to receive a first memory address from, and provide data to, the bus agent;

a first address providing port and a first data receiving port each coupled to the cache;

a second address providing port and a second data receiving port each coupled to the memory subsystem;

memory transaction supplying logic coupled between the first address receiving port and the second address providing port;

control logic coupled to the cache and to the memory subsystem, the control logic responsive to an intervention signal from the cache, wherein the control logic discontinues a burst memory access at the memory subsystem in response to an assertion of the intervention signal and continues the burst memory access at the memory subsystem in response to a deassertion of the intervention signal;

bus driver logic responsive to the intervention signal, the bus driver logic selectively coupling the first data receiving port to the first data providing port in response to the assertion of the intervention signal and selectively coupling the second data receiving port to the first data providing port in response to the deassertion of the intervention signal.

2. A bus control interface, as recited in claim 1, further comprising a next address store incrementingly responsive to successive ready for next data signals, the control logic being coupled to the next address store to supply a next address value from the next address store to the memory subsystem to requeue the burst memory access.

3. A bus control interface, as recited in claim 1,
wherein discontinuation of the burst memory access in response to a first instance of the intervention signal includes dequeuing of the burst memory access; and
wherein discontinuation of the burst memory access in response to a subsequent instance of the intervention signal includes termination of the burst memory access.

4. A bus control interface, as recited in claim 1, wherein the bus agent comprises a PCI bus agent, and wherein the PCI bus agent is coupled to the memory address receiving port and the data providing port by a PCI bridge.

5. A bus control interface, as recited in claim 1, wherein the bus agent comprises a PCI bus agent.

6. A bus control interface, as recited in claim 1, wherein the memory transaction supplying logic includes queuing and multiplexing logic coupled between a first set of memory transaction information receiving ports and a second set of memory transaction information providing ports, the first set comprising the first address receiving port and the second set comprising the second address providing port.

7. A bus control interface, as recited in claim 6, wherein the first set further comprises a second address receiving port coupled to the cache.

8. A bus control interface, as recited in claim 6, further comprising a third address receiving port and a third data providing port each coupled to a second cache, wherein the first set further comprises the third address receiving port, and wherein the bus driver logic further selectively couples the second data receiving port to the third data providing port.

9. A bus control interface, as recited in claim 8, wherein the first cache comprises a data cache and the second cache comprises an instruction cache, and wherein the bus driver logic allows simultaneous coupling of the second data receiving port to the third data providing port and of the first data receiving port to the first data providing port, such that the bus control interface allows simultaneous servicing of a bus agent memory access by the data cache and of an instruction cache line fill by the memory subsystem.

10. A bus control interface, as recited in claim 7, wherein the first address providing port, the first data receiving port, and the second address receiving port each couple to the cache via a shared address/data bus.

11. A computer system comprising:
a memory subsystem having a plurality of addressable storage locations for representing data;
a cache having a plurality of cache storage locations for representing cached data, the cache storage locations dynamically associated with cached ones of the addressable storage locations;
a burst transfer agent; and
an interface unit coupled between the burst transfer agent and the memory subsystem and between the burst transfer agent and the cache, the interface unit providing transparent burst mode read access to data associated with the block of the addressable memory locations, wherein a first portion of the block is represented in the cache and a second portion of the block is represented in the memory subsystem, the interface unit selectively and transparently coupling one of the memory subsystem and the cache to the burst transfer agent wherein the coupled one is the cache when data associated with a current read position in the block are represented in the cache and wherein the coupled one is the memory subsystem when the data associated with the current read position in the block are not represented in the cache.

12. A computer system, as recited in claim 11, wherein the interface unit comprises:
read request distribution logic to provide information from a burst read request from the burst transfer agent to the memory subsystem and to the cache;
selective bus coupling logic to couple one of the memory subsystem and the cache to the burst transfer agent; and
control logic coupled to the selective bus coupling logic and responsive to an intervention signal from the cache, the control logic dequeuing a burst read access, if any, queued for the memory subsystem, terminating an ongoing burst read access, if any, at the memory subsystem, and causing the selective bus coupling logic to couple the cache to the burst transfer agent in response to an assertion of the intervention signal, the control logic requeuing the burst read access at the memory subsystem and causing the selective bus coupling logic to couple the memory subsystem to the burst transfer agent in response to an deassertion of the intervention signal.

13. A computer system, as recited in claim 12, wherein the interface unit further comprises a next address store incrementingly responsive to successive ready for next data signals, and wherein the read requeuing logic supplies a next address value from the next address store to the memory subsystem to requeue the burst read access at the second memory read.

14. A computer system, as recited in claim 13, wherein the cache includes a second next address store incrementingly responsive to successive ready for next data signals, and wherein the cache asserts and deasserts the intervention signal in correspondence with a cached/uncached status of ones of the addressable storage locations associated with a next address value from the second next address store.

15. A computer system, as recited in claim 14, wherein the intervention signal is asserted and deasserted by the cache during a final memory access cycle of a memory block access temporally prior to the corresponding dequeuing, termination, or requeuing of the memory access by the control logic to allow for transparent steering of the burst read access between the memory subsystem and the cache, without disconnect and without interruption of a ready train of the ready for next data signals.

16. A computer system, as recited in claim 11, wherein a burst transfer initiator and a distinct burst transfer target together comprise the burst transfer agent.

17. A computer system, as recited in claim 11, wherein the burst transfer agent is both an initiator and a target for a burst transfer.

18. A method for transparently steering individual accesses of a burst memory transfer, the method steering individual accesses between a memory subsystem and a cache, the method comprising the steps of:

coincidently supplying a first memory address to the memory subsystem and to the cache;

comparing the first memory address against a representation of cached addresses;

asserting, in the case of a first match between the first memory address and the representation of cached addresses, a data intervention signal;

responsive to the assertion of the data intervention signal, dequeuing access to memory subsystem data associated with the first memory address, and instead, supplying from the cache, data associated with the first memory address;

incrementing a next address coincident with supplying, from the cache, data associated with subsequent memory addresses;

comparing the next address against the representation of cached addresses;

deasserting, in the case of an absence of match between the next address and the representation of cached addresses, the data intervention signal;

responsive to the deassertion of the data intervention signal, requeuing a second memory address at the memory subsystem, wherein the second memory address corresponds to the next address; and supplying from the memory subsystem, data associated with the second memory address.

19. A method, as recited in claim 18, further comprising the steps of:

incrementing the next address coincident with supplying, from the memory subsystem, data associated with subsequent memory addresses;

comparing the next address against the representation of cached addresses;

asserting, in the case of a second match between the next address and the representation of cached addresses, the data intervention signal; and responsive to the assertion of the data intervention signal, terminating access to memory subsystem data associated with a third memory address, and instead, supplying from the cache, data associated with the third memory address.

20. A method, as recited in claim 18, wherein the incrementing step is performed on cache block boundaries.

21. A method, as recited in claim 20, wherein the assertion and deassertion steps are respectively performed during a final memory access cycle of a memory block access temporally prior to the dequeuing and requeuing steps.

22. An interface coupled to a memory subsystem and a cache to transparently steer individual memory accesses in accordance with the method of claim 18.

23. An apparatus comprising:

read request distribution logic to provide information from a memory read requester to first and second storage devices, the second storage device being adapted to cache data represented by the first storage device;

selective bus coupling logic to couple one of the first and second storage devices to the memory read requester; and control logic coupled to the selective bus coupling logic and responsive to an intervention signal from the second storage device, the control logic discontinuing a memory read request for the first storage device and causing the selective bus coupling logic to couple the second storage device to the memory read requester in response to an assertion of the intervention signal, the control logic continuing the memory read request to the first storage device and causing the selective bus coupling logic to couple the first storage device to the memory read requester in response to an deassertion of the intervention signal.

24. An apparatus, as recited in claim 23, wherein the control logic requeues the memory read access for the first storage device in response to the deassertion of the intervention signal.

25. An apparatus, as recited in claim 24, further comprising a next address store incrementingly responsive to successive ready for next data signals, wherein the memory read request requeuing logic is coupled to the next address store to supply a next address value from the next address store to the first storage device for requeuing the memory read request.

26. An apparatus, as recited in claim 23, wherein the control logic dequeues a memory read request queued for the first storage device in response to the assertion of the intervention signal.

27. An apparatus, as recited in claim 23, wherein the control logic terminates an ongoing memory read access at the first storage device in response to the assertion of the intervention signal.

* * * * *